US007655088B2

(12) United States Patent
Bethani

(10) Patent No.: US 7,655,088 B2
(45) Date of Patent: Feb. 2, 2010

(54) SYNTHETIC AGGREGATES COMPRISING SEWAGE SLUDGE AND OTHER WASTE MATERIALS AND METHODS FOR PRODUCING SUCH AGGREGATES

(75) Inventor: Sophia Bethani, Athens (GR)

(73) Assignee: Alkemy, Ltd., Hamilton (BM)

( * ) Notice: Subject to any disclaimer, the term of this patent is extended or adjusted under 35 U.S.C. 154(b) by 204 days.

(21) Appl. No.: 11/332,459

(22) Filed: Jan. 13, 2006

(65) Prior Publication Data

US 2006/0213397 A1 Sep. 28, 2006

Related U.S. Application Data

(60) Provisional application No. 60/721,888, filed on Sep. 28, 2005.

(30) Foreign Application Priority Data

Jan. 14, 2005 (GR) .............................. 20050100015
Sep. 16, 2005 (GR) .............................. 20050100470

(51) Int. Cl.
*C04B 18/08* (2006.01)
(52) U.S. Cl. .................................. 106/705; 106/DIG. 1
(58) Field of Classification Search ................. 106/705, 106/DIG. 1
See application file for complete search history.

(56) References Cited

U.S. PATENT DOCUMENTS

| 1,895,159 | A | * | 1/1933 | Greenawalt | ................. 106/407 |
| 2,946,112 | A | | 7/1960 | Tucker, Jr. et al. | |
| 2,948,948 | A | | 8/1960 | Duplin, Jr. et al. | |
| 3,030,222 | A | * | 4/1962 | Eichenlaub | ................. 106/405 |
| 3,573,940 | A | | 4/1971 | Cockrell et al. | |
| 3,600,476 | A | | 8/1971 | Suzuki et al. | |
| 3,679,445 | A | | 7/1972 | Howe | |

(Continued)

FOREIGN PATENT DOCUMENTS

CN 1227207 A 9/1999

(Continued)

OTHER PUBLICATIONS

Wainwright, P.J., "Artificial Aggregate From Domestic Refuse", Concrete, May 1981, pp. 25-29, 15(5), U.K.

(Continued)

*Primary Examiner*—Paul Marcantoni
(74) *Attorney, Agent, or Firm*—Brandon N. Sklar, Esq.; Kaye Scholer LLP

(57) ABSTRACT

In one example of an embodiment of the invention, a method for producing an aggregate is disclosed comprising mixing sewage sludge from a waste water treatment facility with a non-coal combustion ash silicoaluminous waste material, agglomerating the mixture to form an agglomerate, and pyroprocessing the agglomerate to form an aggregate. The waste material may comprise municipal solid waste incinerator bottom ash, incinerator fly ash, incinerator filter dusts, cement kiln dusts, waste glass, blast furnace slag, kiln dusts, and/or granite sawing residues, for example. The method may further comprise milling the waste material prior to mixing. Preferably, the milling is wet milling. Pyroprocessing of the agglomerate may take place in a rotary kiln. The resulting aggregate may be a lightweight or a normal weight, sintered or vitrified aggregate. Aggregates and methods for making aggregates of high and low calcium silicoaluminous materials are also disclosed.

62 Claims, 12 Drawing Sheets

EFFECT OF SINTERING ON SS/GSR AGGREGATES

U.S. PATENT DOCUMENTS

| | | |
|---|---|---|
| 3,846,366 A | 11/1974 | Wallace |
| 3,877,920 A | 4/1975 | Carlberg |
| 3,954,390 A | 5/1976 | Akhundov et al. |
| 3,961,973 A | 6/1976 | Jones |
| 3,973,973 A | 8/1976 | Leach |
| 4,028,130 A | 6/1977 | Webster et al. |
| 4,038,025 A | 7/1977 | Kratochvil |
| 4,057,605 A | 11/1977 | Chauvin |
| 4,081,285 A | 3/1978 | Pennell |
| 4,120,735 A | 10/1978 | Smith |
| 4,168,951 A | 9/1979 | Drugge |
| 4,198,224 A | 4/1980 | Kirkpatrick |
| 4,226,630 A | 10/1980 | Styron |
| 4,255,131 A | 3/1981 | Johnson, Jr. |
| 4,274,825 A | 6/1981 | North |
| 4,289,479 A | 9/1981 | Johnson, Jr. |
| 4,342,554 A | 8/1982 | Rohrbach |
| 4,343,751 A | 8/1982 | Kumar |
| 4,356,030 A | 10/1982 | Halpin et al. |
| 4,377,414 A | 3/1983 | Buschmann et al. |
| 4,432,666 A | 2/1984 | Frey et al. |
| 4,624,711 A | 11/1986 | Styron |
| 4,741,782 A | 5/1988 | Styron |
| 4,770,831 A | 9/1988 | Walker |
| 4,780,144 A | 10/1988 | Loggers |
| 4,781,842 A * | 11/1988 | Nicholson ............. 405/129.25 |
| 4,781,944 A | 11/1988 | Jones |
| 4,804,147 A | 2/1989 | Hooper |
| 4,874,153 A | 10/1989 | Hashimoto et al. |
| 4,882,067 A | 11/1989 | Johnson et al. |
| 4,902,431 A | 2/1990 | Nicholson et al. |
| 4,943,233 A | 7/1990 | Diaz |
| 4,984,983 A | 1/1991 | Enkegaard |
| 4,993,331 A | 2/1991 | White et al. |
| 5,018,459 A | 5/1991 | Judd |
| 5,057,009 A * | 10/1991 | Nechvatal et al. ............. 432/14 |
| 5,175,134 A | 12/1992 | Kaneko et al. |
| 5,246,599 A | 9/1993 | Aicher |
| 5,265,545 A | 11/1993 | Milner |
| 5,268,028 A | 12/1993 | Fifield |
| 5,268,131 A | 12/1993 | Harrison |
| 5,277,826 A * | 1/1994 | Burns et al. ............. 588/249.5 |
| 5,342,442 A * | 8/1994 | Nechvatal et al. ........... 106/409 |
| RE34,775 E | 11/1994 | Nechvatal et al. |
| 5,362,319 A | 11/1994 | Johnson |
| 5,482,458 A | 1/1996 | Kyffin |
| 5,500,044 A | 3/1996 | Meade et al. |
| RE35,219 E | 4/1996 | Kent |
| 5,521,132 A | 5/1996 | Talmy et al. |
| 5,583,079 A | 12/1996 | Golitz et al. |
| 5,595,480 A | 1/1997 | Wang |
| 5,669,969 A | 9/1997 | Meade et al. |
| 5,678,235 A | 10/1997 | Crowe |
| 5,704,972 A | 1/1998 | Ivkovich |
| 5,772,751 A | 6/1998 | Nisnevich et al. |
| 5,772,937 A | 6/1998 | Cohen et al. |
| 5,797,496 A | 8/1998 | Kirchen et al. |
| 5,935,885 A | 8/1999 | Hnat et al. |
| 6,084,146 A | 7/2000 | Barkatt et al. |
| 6,105,517 A | 8/2000 | Swithenbank |
| 6,183,242 B1 | 2/2001 | Heian |
| 6,288,300 B1 | 9/2001 | Lemus et al. |
| 6,342,461 B1 | 1/2002 | Lee et al. |
| 6,440,884 B1 | 8/2002 | Devagnanam |
| 6,468,074 B1 | 10/2002 | Wu |
| 6,528,547 B2 | 3/2003 | Shulman |
| 6,627,083 B2 | 9/2003 | Rennesund et al. |
| 6,755,905 B2 | 6/2004 | Oates et al. |
| 6,818,055 B2 | 11/2004 | Schelinski |
| 6,887,389 B2 | 5/2005 | Judd |
| 2003/0047114 A1 | 3/2003 | Kayali et al. |
| 2003/0148879 A1 | 8/2003 | Beaumont et al. |
| 2004/0217505 A1 | 11/2004 | Singh |
| 2005/0130828 A1 | 6/2005 | Ohono et al. |
| 2006/0162618 A1 | 7/2006 | Bethani |
| 2006/0162619 A1 | 7/2006 | Bethani |

FOREIGN PATENT DOCUMENTS

| | | |
|---|---|---|
| DE | 3908172 | 9/1990 |
| EP | 0 034 389 A1 | 8/1981 |
| GB | 942620 B1 | 11/1963 |
| GB | 1396205 | 6/1975 |
| GB | 2 189 250 A | 10/1987 |
| GB | 2 218 412 A | 11/1989 |
| GB | 2 273 095 A | 8/1994 |
| JP | 8-12413 A | 1/1996 |
| JP | 9-30857 A1 | 2/1997 |
| JP | 9-156998 A1 | 6/1997 |
| JP | 11035356 | 2/1999 |
| JP | 11035358 | 2/1999 |
| JP | 2001146444 | 5/2001 |
| JP | 2002274902 | 9/2002 |
| JP | 2005126282 | 5/2005 |
| KR | 10-0562169 | 3/2006 |
| WO | WO 2006/074944 A1 | 7/2006 |
| WO | WO 2006/074946 A2 | 7/2006 |

OTHER PUBLICATIONS

Show, K.Y., Lee, D.J., Tay, J.H., Hong, S.Y., and Chien, C.Y., "Lightweight Aggregates from Industrial Sludge-Marine Clay Mixes." Journal of Environmental Engineering, vol. 131, No. 7, Jul. 2005, pp. 1106-1113, International Solid Waste Association, Denmark.

Cheeseman, C.R.; and Virdi, G.S., "Properties and Microstructure of Lightweight Aggregate Produced from Sintered Sewage Sludge Ash", Resources, Conservation, and Recycling, vol. 45, 2005, pp. 18-30, Elsevier Ltd., Oxford, U.K.

Tay, J.H.; and Show, K. Y., "Resource Recovery of Sludge as a Building and Construction Material—A Future Trend in Sludge Management", Water Science and Technology, vol. 36, No. 11, 1997, pp. 259-266, Elsevier Science Ltd., Oxford, U.K.

Wainwright, P.J.; and Cresswell, D.J.F., "Synthetic Aggregates From Combustion Ashes Using an Innovative Rotary Kiln", Waste Management, vol. 21, 2001, pp. 241-246, Elsevier Science Ltd., Oxford, U.K.

Wiebusch, B.; and Seyfried, C.F., "Utilization of Sewage Sludge Ashes in the Brick and Tile Industry", Water Science and Technology, vol. 36, No. 11, 1997, pp. 251-258, Elsevier Science Ltd., Oxford, U.K.

Bethani, Sophia; Thesis "Production of Lightweight Aggregates From "Energy From Waste" Combustion Ashes"; Department of Civil and Environmental Engineering, Imperial College of Science, Technology and Medicine, London, Nov. 2004.

Bethanis, S.; and Cheeseman C.R., "Production of Lightweight Aggregate from Incinerator Bottom Ash and Pulverised Fuel Ash", Waste Management and the Environment ll 2004, pp. 55-64, XP 008053699.

Abstract of Korean Patent for KR 2003 071 419 A (Lee M S) Sep. 3, 2003; Database WPI Section Ch., Week 200405 Derwent Publications Ltd., London, GB; AN 2004-049377 XP 002376996.

Abstract of Korean Patent for KR 2002 078 079 A (Tan Co., Ltd.) Oct. 18, 2002; Database WPI Section Ch., Week 200326 Derwent Publications Ltd., London, GB; AN 2003-264145 XP002376995.

Abstract of Japan for JP 08 239254 A (Chichibu Onoda Cement Corp) Sep. 17, 1996; Patent Abstracts of Japan vol. 1997, No. 01, Jan. 31, 1997.

Ries, J.P. and Holm, T.A., "A Holistic Approach to Sustainability For the Concrete Community—Lightweight Concrete-Two Millennia of Proven Performance", Information Sheet 7700.1, Apr. 2004, ESCSI, Salt Lake City, Utah.

Huang, W. and Chu, S., "A Study on the Cementlike Properties of Municipal Waste Incineration Ashes", Cement and Concrete Research vol. 33, pp. 1795-1799, Elsevier Ltd., Oxford, U.K.

Barbieri, L.; Corradi, A.; and Lancellotti, I., "Bulk and Sintered Glass-Ceramics By Recycling Municipal Incinerator Bottom Ash", Journal of the European Ceramic Society, vol. 20, 2000, pp. 1637-1643, Elsevier Science Ltd., Oxford, U.K.

Cheeseman, C.R.; Monteiro Da Rocha, S.; Sollars, C.; Bethanis, S.; and Boccaccini, A.R., "Ceramic Processing of Incinerator Bottom Ash", Waste Management 23 (2003), pp. 907-916, Elsevier Ltd., Oxford, U.K.

Forteza, R.; Far, M.; Segui, C.; and Cerda, V., "Characterization of Bottom Ash in Municipal Solid Waste Incinerators For Its Use in Road Base", Waste Management 24 (2004), pp. 899-909, Elsevier Ltd., Oxford, U.K.

Souza, G.P.; Filgueira, M.; Rosenthal, R. et al., "Characterization of natural diatomaceous composite material", Ceramica, Jan./Mar. 2003 vol. 49, No. 309, pp. 40-43, Sao Paulo, Brazil. (with English Language Abstract).

Santos, R.S.; Souza, G.P.; and Holanda, J.N.F., "Characterization of Waste of Petroleum Industry Containing Clayey Masses and Its Application in Structural Ceramics", Ceramica, Jul./Sep. vol. 48 No. 307 2002, pp. 115-120, Sao Paulo, Brazil. (with English Language Abstract).

Derman, J.D.; Schlieper, H.A., "Decontamination and Beneficial Reuse of Dredged Material Using Existing Infrastructure for the Manufacture of Lightweight Aggregate", Presented at 19th Western Dredging Association (WEDA XIX) Annual Meeting and Conference and 31st Texas A&M University Dredging Seminar (TAMU 31), May 15-20, 1999, Louisville, Kentucky.

Barbieri, Luisa, et al., "Design, Obtainment and Properties of Glasses and Glass-Ceramics From Coal Fly Ash", Fuel, 1999, vol. 78, pp. 271-276, Elsevier Science Ltd., Oxford, U.K.

Ghosh, S.; Das, Mihir; Chakrabarti, S.and Ghatak, S., "Development of Ceramic Tiles from Common Clay and Blast Furnace Slag", Ceramics International, 2002, vol. 28, pp. 393-400, Elsevier Science Ltd., Oxford, U.K.

Cheng, T.W., "Effect of Additional Materials On the Properties of Glass-Ceramic Produced From Incinerator Fly Ashes", Chemosphere, vol. 56, 2004, pp. 127-131, Elsevier Ltd., Oxford, U.K.

Pinto, M.F.; Sousa, S.J.G.; and Holanda, J.N.F., "Effect of Firing Cycle on the Technological Properties of a Red Wall Tile Paste", Ceramica, Jul./Sep. 2005, vol. 51, No. 319, pp. 225-229, Sao Paulo, Brazil. (with English Language Abstract).

Bethanis, B.; Cheeseman, C.and Sollars, C., "Effect of Sintering Temperature on the Properties and Leaching of Incinerator Bottom Ash", Waste Management & Research, vol. 22, 2004, pp. 255-264, International Solid Waste Association, U.K.

Dana, K.; Das, S.and Das, S.K., "Effect of Substitution of Fly Ash for Quartz in Triaxial Kaolin-Quartz-Feldspar System", Journal of the European Ceramic Society, 2004, vol. 24, pp. 3169-3175, Elsevier Ltd., Oxford, U.K.

Basegio, T.; Berutti, F.; Bernardes, A. and Bergmann, C.P., "Environmental and Technical Aspects of the Utilisation of Tannery Sludge as a Raw Material for Clay Products", Journal of the European Ceramic Society, 2002, vol. 22, pp. 2251-2259, Elsevier Science Ltd., Oxford, U.K.

Sousa, S.J.G.; and Holanda, J.N.F., "Evaluation of Physical-Mechanical Properties of a Ceramic Paste for Porous Wall Tile (BIII)", Ceramica, Jan./Mar. 2005, vol. 51 No. 317, pp. 70-76, Sao Paulo, Brazil. (with English Language Abstract).

"Furnace Bottom Ash (FBA) in Light Weight Aggregate (LWA) Concrete Blocks", Technical Data Sheet, http://www.ukqaa.org.uk/Datasheets_PDF/Datasheet_7-0_Aug_2004.pdf, Aug. 2004, United Kingdom Quality Ash Association, U.K.

"Incinerator Bottom Ash", http://web.archive.org/web/20050315073113/http://www.hanson.co.uk/Products-Services/Aggregates/Recycled/iba/, Hanson, U.K. (at least as early as Jul. 15, 2005).

Bethanis, S., "Incorporation of Starch in Waste Ashes and its Impact on Porosity Formation of Ceramics", Proceedings of the 20th International Conference on Solid Waste Technology and Management, Apr. 3-6, 2005, Philadelphia, PA.

"Lightweight Aggregate" http://www.epa.gov/epaoswer/other/mining/minedock/id/id4-lwa.pdf, Environmental Protection Agency, U.S. (undated).

"Lightweight Aggregates Manufactured from Pulverised Fuel Ash", http://www.ukqaa.org.uk/Datasheets_PDF/Datasheet_4-0_Aug_2003.pdf, Aug. 2004, U.K.

"Lightweight Aggregate Plant", http://www.r-s.com/projects/96WD10.htm, Roberts & Schaefer Company, Illinois, 2000, U.S.

Bethanis, S.; Cheeseman, C.R., "Manufacture of Lightweight Aggregate from Incinerator Bottom Ash and Pulverised Fuel Ash", Proceedings of the Heleco Conference, Feb. 3-6, 2005, Athens, Greece.

Bijen, J.M., "Manufacturing Processes of Artificial Lightweight Aggregates from Fly Ash", The International Journal of Cement Composites and Lightweight Concrete, Aug. 1986, vol. 8, No. 3, pp. 191-199, U.K.

Hernandez-Crespo, M.S.; and J. Ma. Rincon, "New Porcelainized Stoneware Materials Obtained by Recycling of MSW Incinerator Fly Ashes and Granite Sawing Residues.", Ceramics International, 2001, vol. 27, pp. 713-720, Elsevier Science Ltd., Oxford, U.K.

Zakaria, M.; and Cabrera, J.G., "Performance and Durability of Concrete Made With Demolition Waste and Artificial Fly Ash-Clay Aggregates", Waste Management, 1996, vol. 16, Nos. 1-3, pp. 151-158, Elsevier Science Ltd., Oxford, U.K.

Bethanis, S., "Production of Synthetic Aggregates from Waste Ashes", Proceedings of the 20th International Conference on Solid Waste Technology and Management, Apr. 3-6, 2005, Philadelphia, PA.

Bethanis, S.; Cheeseman C.R.; and Sollars, C.J., "Properties and Microstructure of Sintered Incinerator Bottom Ash", Ceramics Interntional, 2002, vol. 28, pp. 881-886, Elsevier Science Ltd., Oxford, U.K.

Cheeseman, C.R.; Makinde, A.; and Bethanis, S. "Properties of Lightweight Aggregate Produced By Rapid Sintering of Incinerator Bottom Ash", Resources, Conservation, and Recycling, vol. 43, 2004, pp. 147-162, Elsevier Ltd., Oxford, U.K.

Bai, Y.; Ibrahim, R.; and Basheer, P.A., "Properties of Lightweight Concrete Manufactured With Fly Ash, Furnace Bottom Ash, and Lytag", International Workshop on Sustainable Development and Concrete Technology, May 20-21, 2004, Beijing, China.

Kuennen, T., "Synthetic Aggregates Promise New Options for Engineers", Better Roads, Jun. 2005, http://obr.gcnpublishing.com/articles/jun05e.htm, James Informational Media Inc., Illinois, U.S.

Swamy, R.N.; and Lambert, G.H., "The Microstructure of Lytag Aggregate", The International Journal of Cement Composites and Lightweight Concrete, Nov. 1981, vol. 3, No. 4, pp. 273-282, Construction Press, England.

Wang, K.-S.; Tsai, C.-C.; Lin, K.-L.; and Chiang, KY., "The Recycling of MSW Incinerator Bottom Ash by Sintering" Waste Management & Research, vol. 21, 2003, pp. 318-329, International Solid Waste Association, Denmark.

"The Use of Incinerator Bottom Ash as Aggregate" Aggregates Advisory Service, Mar. 1999, Digest No. 065, Energy from Waste Association, Department of the Environment, London, England.

Schroeder, R.L., "The Use of Recycled Materials in Highway Construction", Public Roads, vol. 58, Autumn 1994, Federal Highway Administration, Washington D.C., U.S.

Menezes, R.R. et al., "Use of Granite Sawing Wastes in the Production of Ceramic Bricks and Tiles", Journal of the European Ceramic Society, vol. 25, May 2005, pp. 1149-1158, Elsevier Ltd., Oxford, U.K.

Barbieri, L.; Corradi, A.; Lancellotti, I.; and Manfredini, T., "Use of Municipal Incinerator Bottom Ash as Sintering Promoter in Industrial Ceramics", Waste Management, 2002, vol. 22, pp. 859-863, Elsevier Science Ltd., Oxford, U.K.

"Use of Recycled Materials and Industrial By-Products in Concrete" http://www.greenconcrete.dundee.ac.uk/ProtectOverview.htm, Jan. 2, 2005, University of Dundee, Scotland, U.K.

Segadaes, A.M.; Carvalho, M.A.; and Acchar, W., "Using Marble and Granite Rejects to Enhance the Processing of Clay Products", Applied Clay Science, 2005, pp. 42-52, Elsevier B.V., Oxford, U.K.

Baykal, G.; and Doven A.G., "Utilization of Fly Ash by Pelletization Process; Theory, Application Areas and Research Results", Resources, Conservation and Recycling, vol. 30, 2000, pp. 59-77, Elsevier Science Ltd., Oxford, U.K.

Moreira, J.M.S.; Freire, M.N.; and Holanda, J.N.F., "Utilization of Granite Sawing Waste from Espirito Santo State in Red Ceramic", Ceramica, Oct./Dec. 2003, pp. 262-267, vol. 49, No. 312, Sao Paulo, Brazil. (with English Language Abstract).

"Utilization of Lightweight Aggregates Made from Coal Gasification Slags", http://www.icci.org/99final/choudhry.htm, Illinois Clean Coal Institute, 1999, Illinois, U.S.

"Utilization of Lightweight Materials Made from Coal Gasification Slags", Quarterly Report No. 2019, http://www.osti.gov/bridge/servlets/purl/758161-Id7qbW/webviewable/758161.PDF, Sep. 1999, U.S. Department of Energy—Office of Fossil Energy, West Virginia, U.S.

Moreira, J.M.S.; Manhaes, J.P.V.T.; and Holanda, J.N.F., "Utilization of Ornamental Rock Waste from Northwest Fluminese in Red Ceramic", Ceramica, vol. 51, No. 319, Jul./Sep. 2005, pp. 180-186, Sao Paulo, Brazil. (with English Language Abstract).

Oliveira, G.E.; and Holanda, J.N.F., "Utilization of Solid Waste from Siderurgical Industry in Red Ceramic", Ceramica, Apr./Jun. 2004, pp. 75-80, vol. 50, No. 314, Sao Paulo, Brazil. (with English Language Abstract).

Manfred, K, "Vitrification of Waste Materials", Glass Science and Technology, vol. 70, Dec. 1997, pp. 375-381, Würzburg, Germany.

* cited by examiner

FIGURE 1  EFFECT OF SINTERING ON SS/GSR AGGREGATES

FIGURE 2   EFFECT OF SINTERING ON SS/CKD AGGREGATES

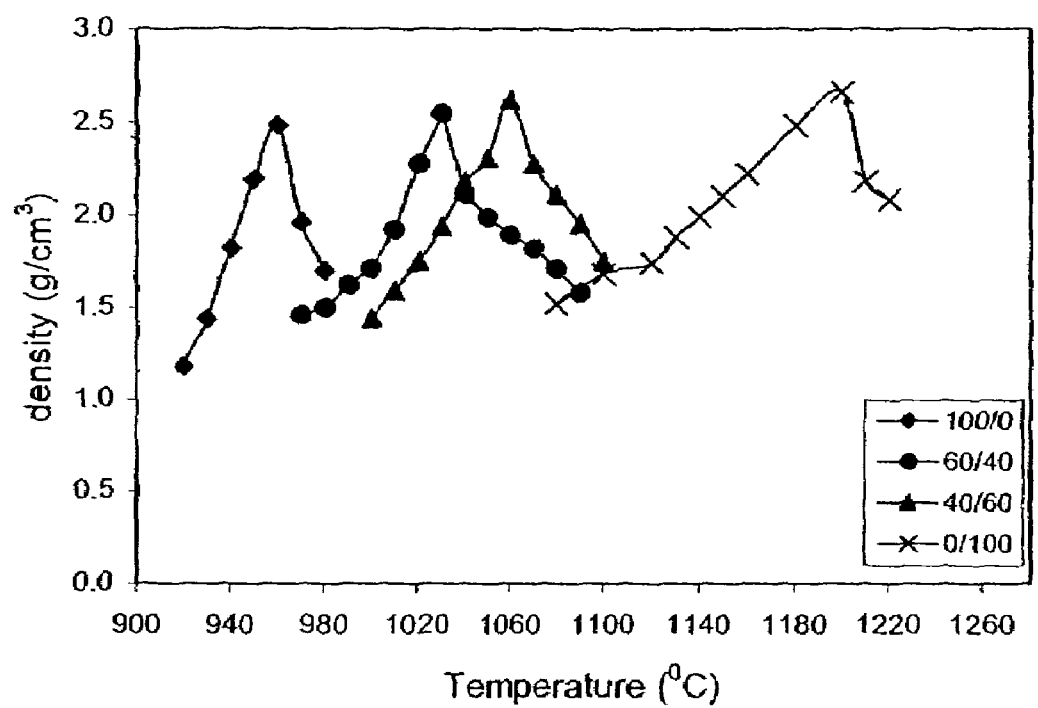
FIGURE 9   EFFECT OF PYROPROCESSING ON SS/WG AGGREGATES

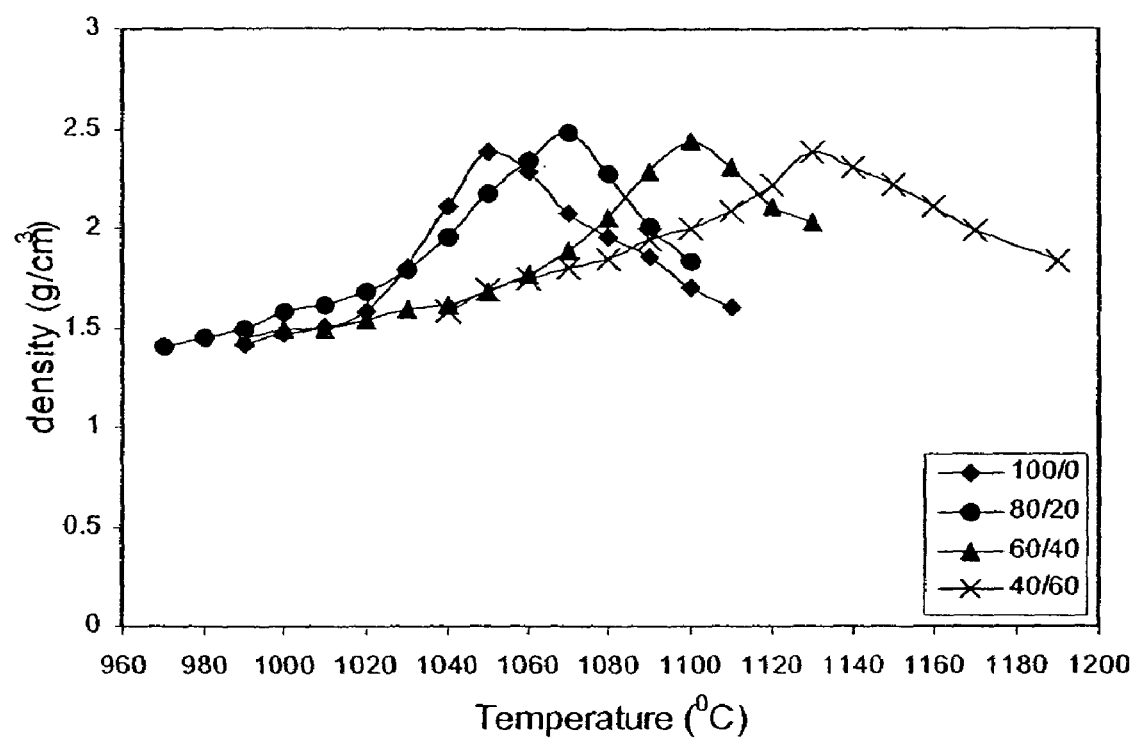
FIGURE 10  EFFECT OF SINTERING ON SS/GSR AGGREGATES

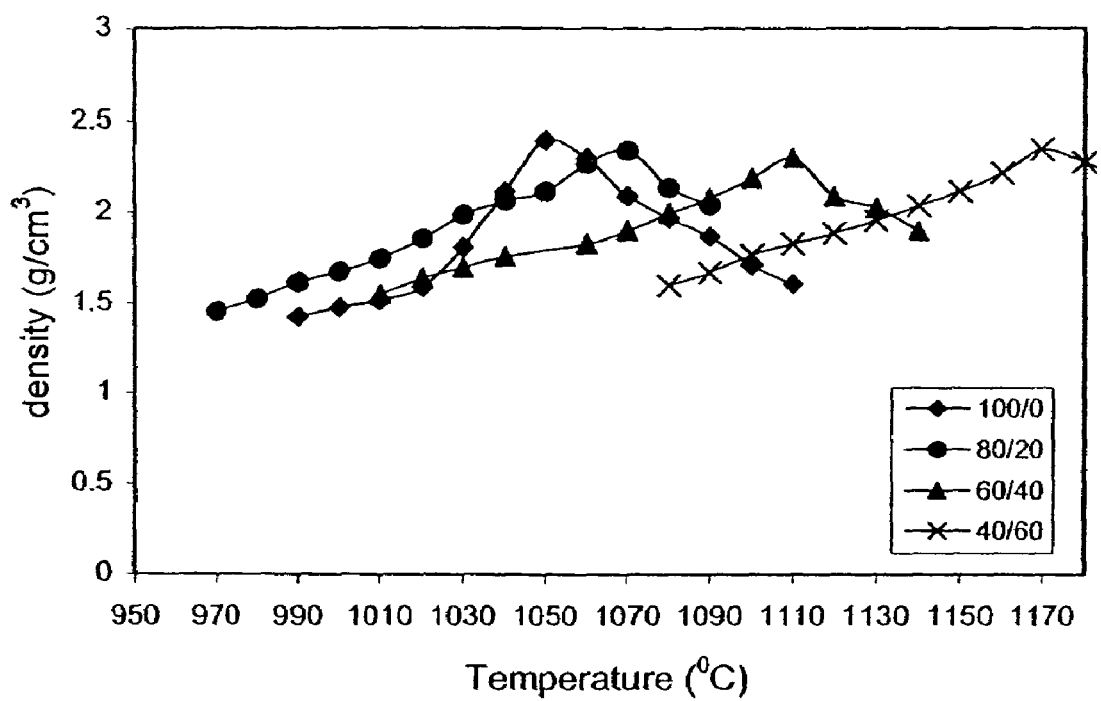
FIGURE 11 EFFECT OF SINTERING ON SS/SLATE AGGREGATES

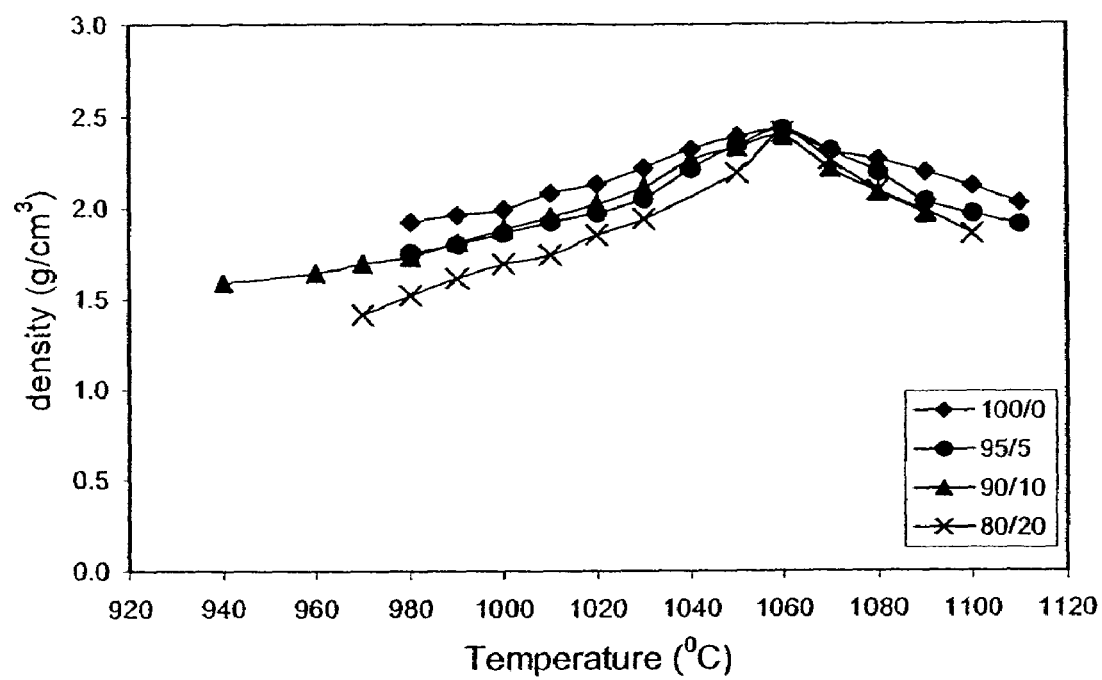
FIGURE 12   EFFECT OF SINTERING ON SS/LIMESTONE AGGREGATES

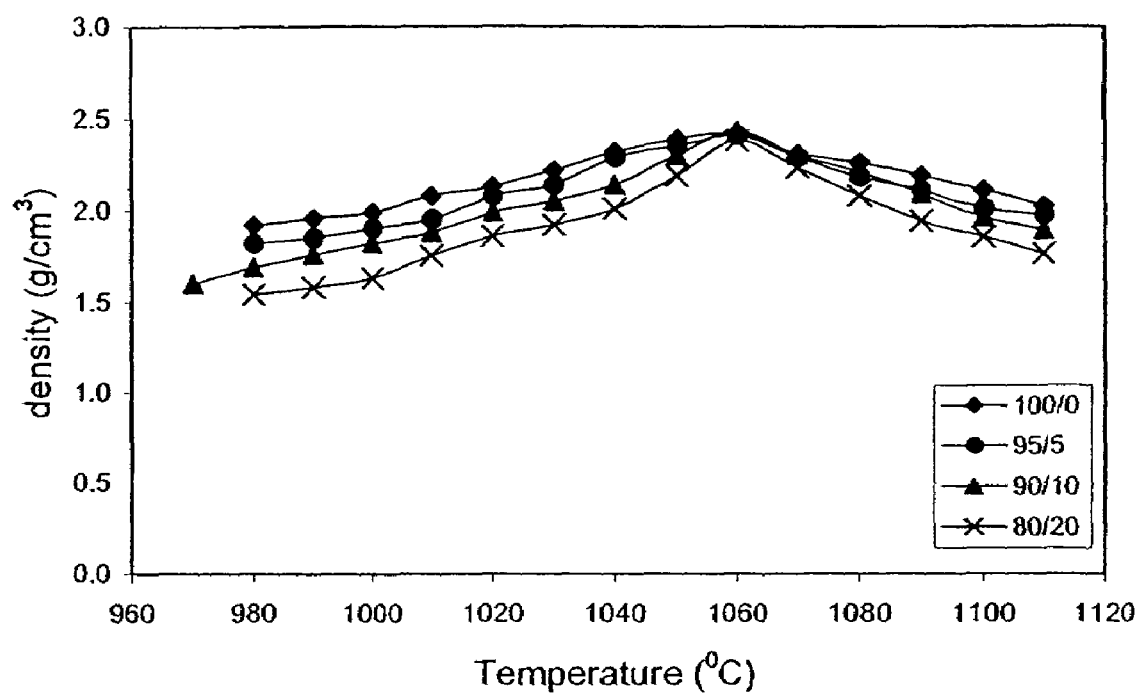
FIGURE 13  EFFECT OF SINTERING ON SS/IFA AGGREGATES

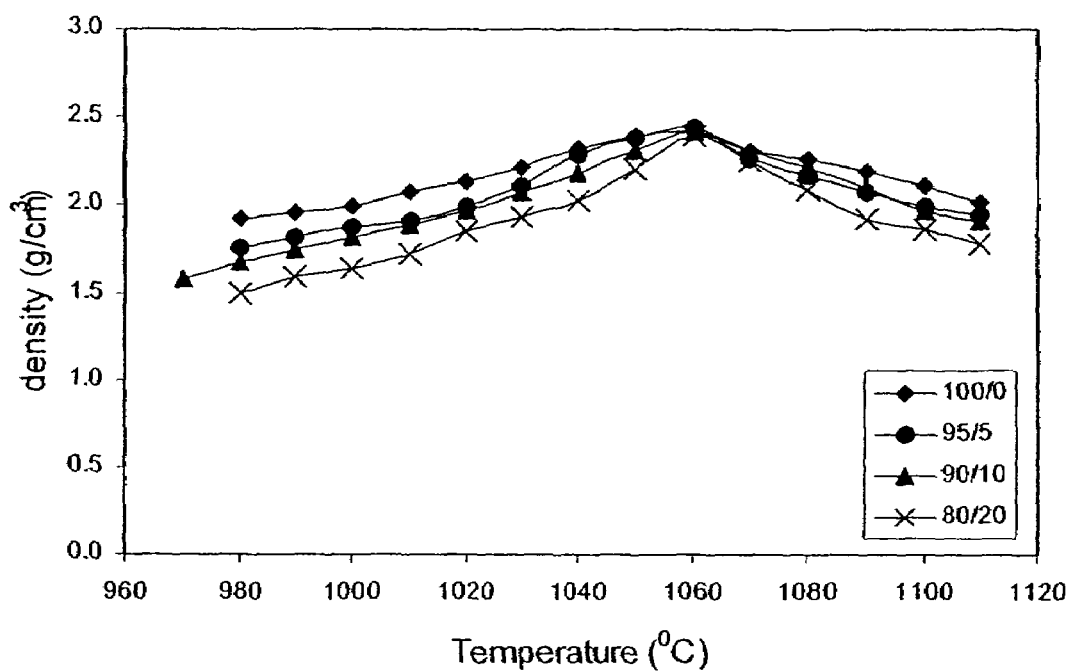
FIGURE 14 EFFECT OF SINTERING ON SLUDGE/GGBS AGGREGATES

SYNTHETIC AGGREGATES COMPRISING SEWAGE SLUDGE AND OTHER WASTE MATERIALS AND METHODS FOR PRODUCING SUCH AGGREGATES

The present application claims the benefit of U.S. Provisional Patent Application No. 60/721,888, which was filed on Sep. 28, 2005, is assigned to the assignee of the present application, and is incorporated by reference herein.

FIELD OF THE INVENTION

Synthetic aggregates, and, more particularly, synthetic aggregates comprising sewage sludge and silicoaluminous materials, and synthetic aggregates comprising combinations of low and high calcium containing silicoaluminous materials.

BACKGROUND OF THE INVENTION

Aggregates are essential ingredients of concrete, masonry, and cavity fill insulation. Other applications for aggregates include filler aid or horticultural aggregate. Aggregates may be derived from natural sources with minimal processing or from naturally occurring materials that are heat treated. Aggregates may also be synthetic. Aggregates from natural sources, such as quarries, pits in ground, and riverbeds, for example, are generally composed of rock fragments, gravel, stone, and sand, which may be crushed, washed, and sized for use, as needed. Natural materials that may be used to form aggregates include clay, shale, and slate, which are pyroprocessed, causing expansion of the material. OPTIROC and LECA are examples of commercially available expanded clay aggregates, for example. Synthetic aggregates may comprise industrial byproducts, which may be waste materials. LYTAG, for example, is a commercially available sintered aggregate comprising pulverized fuel ash ("PFA"), also known as fly ash. PFA is produced from the combustion of coal in power plants, for example.

Natural aggregates for use in construction are in very high demand. However, aggregate resources are finite and extracting and processing these materials is complicated by environmental issues, legal issues, availability, urban expansion, and transportation costs, for example. There has also been a tremendous increase in waste generation by various industries that must be disposed of in an environmentally and legally acceptable manner. Typically, most generated waste is disposed of in landfills at a great expense. Due to the exhaustion of available landfill sites, the difficulties in acquiring new sites, the potential adverse environmental effects, and the cost of landfilling, disposal of waste materials has been a significant problem for many years.

The processing and transformation of waste materials to produce viable synthetic aggregates for use in concrete and other applications would alleviate both waste problems and the depletion of natural aggregate resources.

Aggregates may be lightweight or normal weight. Lightweight aggregates ("LWAs") have a particle density of less than 2.0 g/cm$^3$ or a dry loose bulk density of less than 1.1 g/cm$^3$, as defined in ASTM specification C330. Normal weight aggregates from gravel, sand, and crushed stone, for example, generally have bulk specific gravities of from about 2.4 to about 2.9 (both oven-dry and saturated-surface-dry), and bulk densities of up to about 1.7 g/cm$^3$. High quality LWAs have a strong but low density sintered ceramic core of uniform structural strength and a dense, continuous, relatively impermeable surface layer to inhibit water absorption. They are physically stable, durable, and environmentally inert. For use in concrete, LWAs should have a sufficient crushing strength and resistance to fragmentation so that the resulting concrete has a strength of greater than 10 MPa and a dry density in a range of about 1.5 g/cm$^3$ to about 2.0 g/cm$^3$. Lower density LWAs may also be produced. Concrete containing LWAs ("LWA concrete") may also have a density as low as about 0.3 g/cm$^3$.

Synthetic lightweight aggregates ("LWAs") have received great attention due to the substantial benefits associated with their use in structural applications. Concrete containing LWAs may be 20-30% lighter than conventional concrete, but just as strong. Even when it is not as strong as conventional concrete, the LWA concrete may have reduced structural dead loads enabling the use of longer spans, narrower cross-sections, and reduced reinforcement in structures. The lower weight of the LWA concrete facilitates handling and reduces transport, equipment, and manpower costs. LWA concrete may also have improved insulating properties, freeze-thaw performance, fire resistance, and sound reduction.

Sewage sludge, which is produced by biological wastewater treatment plants, is a significant waste in terms of volume and heavy metal content. Sewage sludge comprises settled solids accumulated and subsequently separated from the liquid stream during various treatment stages in a plant, such as primary or secondary settling, aerobic or anaerobic digestion or other processes. The composition and characteristics of the sewage sludge may also vary depending upon the wastewater treatment process and the sewage sludge treatment process applied. Sewage sludge can be raw, digested, or de-watered. Sewage sludge contains significant amounts of organic materials and may also contain high concentrations of heavy metals and pathogens. Sewage sludge has generally been disposed of by incineration to form an inert ash that is disposed by lagooning, landfilling, spreading on land as fertilizer or soil conditioning, and ocean dumping, for example. If the sewage sludge has not been treated prior to being spread on land or disposed of in a landfill, undesirable contamination may occur.

Sewage sludge recycling and disposal presents considerable economic and environmental problems. The presence of heavy metals and pathogens in the waste, which may leach from the landfill, is a threat to adjacent ground and water supplies. The availability of landfill sites is also decreasing. In addition, the presence of large amounts of water in sewage sludge, which increases the weight of the waste, causes significant transportation and disposal costs.

Another significant waste produced is the ash stream generated by municipal solid waste ("MSW") incineration. Although the disposal of MSW ash residues to landfill occupies only one-tenth of the volume of the original waste, their management presents a problem due to considerable amounts of solid residues produced, the majority of which is currently landfilled. Incinerator bottom ash ("IBA") is the principal ash stream accounting for approximately 75 to 80% of the total weight of MSW incinerator residues and is a heterogeneous mixture of slag, glass, ceramics, ferrous and nonferrous metals, minerals, other non-combustibles, and unburnt organic matter. IBA is currently used in its raw form (without heat treatment) in the construction of embankments, pavement base and road sub-base courses, soil stabilization, bricks, blocks, and paving stones, and as fillers in particular applications. Although considered a relatively inert waste, leaching of heavy metals in these applications is possible.

MSW incineration also produces a particulate residue in the form of dust suspended in the combustion gases or collected in emission control devices, which is called air pollution control ("APC") residue. This includes fly ash, lime, carbon, and residues collected at the pollution control systems. The incinerator filter dusts ("IFD") are an APC residue collected in baghouse filters produced at a rate of 25-30 kg per 1000 kg of incinerated waste, while fly ash, which in some cases includes IFD, accounts for about 10% to 15% of the total combined ash stream. MSW incinerator fly ash ("IFA") contains high concentrations of hazardous materials, such as heavy metals, dioxins, sulphur compounds, and chlorine compounds, and is therefore classified in most European countries as a toxic and dangerous residue. Therefore, it can only be disposed of in special landfills, which is costly and environmentally unsafe.

Significant volumes of residues are also produced by the mining of minerals, ores, and stones. Typical mining operations include extraction, beneficiation, blasting, crushing, washing, screening, cutting (stone), and stockpiling. These operations produce wastes, such as crushed material of different sizes, powders, mud residues, and waste water, that must be disposed of. Marble and granite rejects, from cutting ornamental stones, for example, include large amounts of rejected mud that is discarded into rivers and lagoons. Granite sawmills and granite cutting machines also generate large amounts of powder and mud waste residues. The term "mining waste" is used herein to refer to the waste produced during these operations. Mining waste needs to be treated prior to lagoon or landfill disposal in order to prevent environmental contamination. Other mining wastes include limestone and dolomite tailings, for example.

Electricity-generating power plants also produce large volumes of ash residues in the form of a fine-grained particulate, known as pulverized fuel ash ("PFA") and a coarse fraction, known as furnace bottom ash ("FBA"). The heavier ash material accounts for 20-30% of the total coal ash produced and is the fraction that falls through the bottom of the furnace. FBA is currently used in its raw form as aggregate in lightweight concrete, in Portland cement production and other asphalt or road base applications.

Other waste generated at high rates include cement kiln dusts ("CKD") and blast furnace slag ("BFS"). CKD is a fine-powdery byproduct of cement manufacture operations captured in the air pollution control dust collection systems of the manufacturing plant. Approximately 14.2 million tons of CKD are produced annually in the United States, and about 64% of the total CKD generated is reused within cement plants. BFS is a nonmetallic product of the production and processing of iron in blast furnaces. It is estimated that approximately 15.5 million tons of BFS are produced annually in the United States, and the majority is used in cement production, as an aggregate or insulating material.

SUMMARY OF THE INVENTION

The economic burdens and environmental risks associated with waste disposal make it advantageous to develop alternative techniques for converting waste into safe, revenue-earning products. The reuse of waste to produce building and construction materials, such as synthetic aggregates, would be an effective option because it provides a great potential for massive waste utilization, as well as reducing demand for non-renewable raw materials for aggregates.

In accordance with an embodiment of the invention, a method for producing an aggregate is disclosed comprising mixing sewage sludge from a waste water treatment facility with a non-coal combustion ash silicoaluminous waste material. The method further comprises agglomerating the mixture to form an agglomerate and pyroprocessing the agglomerate to form an aggregate. The waste material may comprise municipal solid waste incinerator residues, waste glass, blast furnace slag, kiln dusts, and/or mining waste. The municipal solid waste incinerator residues may comprise air pollution control residues and/or incinerator bottom ash. Air pollution control residues include incinerator fly ash and/or incinerator filter dusts. The kiln dusts comprise cement kiln dusts. The mining waste includes granite sawing residues.

In one example, the waste material comprises more calcium than the sewage sludge. In this example, the waste material includes incinerator filter dusts, incinerator bottom ash, cement kiln dusts, waste glass, and/or blast furnace slag. The waste material may comprise more than 9% calcium and the sewage sludge may comprise less than 3% calcium, by dry weight. The resulting aggregate may comprise less than about 10% calcium by dry weight. The method may comprise mixing from about 99% to about 60% sewage sludge with from about 1% to about 40% of the waste material, by dry weight of the mixture. Preferably, the method comprises mixing from about 80% to about 90% sewage sludge with from about 10% to about 20% of the waste material, by dry weight of the mixture.

In another example, the waste material comprises less calcium than the sewage sludge. In this example, the waste material comprises granite sawing residues, and/or waste glass. The waste material may comprise less than about 10% calcium and the sewage sludge may comprise greater than about 10% calcium, by dry weight of the mixture. The aggregate may comprise less than about 10% calcium by dry weight. The method may comprise mixing from about 5% to about 95% sewage sludge with from about 95% to about 5% of the waste material, by dry weight of the mixture. Preferably, the method comprises mixing from about 30% to about 70% sewage sludge with from about 70% to about 30% of the waste material, by dry weight of the mixture. More preferably, the method comprises mixing from about 30% to about 50% sewage sludge with from about 70% to about 50% of the waste material, by dry weight of the mixture.

The method may further comprise milling the waste material prior to mixing. Preferably, the milling is wet milling. The mixture of the sewage sludge and the waste material is preferably milled prior to agglomerating. Preferably, the agglomerating comprises pelletizing. At least some of the water may be removed from the wet milled waste material and at least some of that water may be used during pelletizing and/or quenching of the pyroprocessed agglomerate. The resulting aggregates may have a diameter of from about 3 mm to about 40 mm.

The agglomerates may be coated with an inorganic powder. A plastic binder may be mixed with the sewage sludge and waste material prior to agglomerating. The plastic binder may comprise clay. The clay binder may comprise from about 5% to about 20% by dry weight of the mixture.

Pyroprocessing of the agglomerate may take place in a rotary kiln, for example. The resulting aggregate may be a lightweight aggregate or a normal weight aggregate, for example. The agglomerate may be vitrified. Selected properties of the aggregate may be controlled based, at least in part, on a proportion of the sewage sludge to the waste material and the pyroprocessing temperature. The selected properties may include the density, water absorption, and/or strength of the aggregate.

In accordance with another embodiment of the invention, a method for producing a sintered lightweight aggregate is disclosed comprising preparing a mixture comprising sewage sludge from a waste water treatment facility and a non-coal combustion ash, silicoaluminous waste material, agglomerating the mixture to form an agglomerate, and sintering the agglomerate. The waste material may comprise incinerator fly ash, incinerator filter dust, incinerator bottom ash, waste glass, blast furnace slag, cement kiln dusts, and/or granite sawing residues.

In accordance with another embodiment of the invention, a sintered lightweight aggregate is disclosed comprising sewage sludge from a waste water treatment facility and a non-coal combustion ash, silicoaluminous waste material. A mixture of the sewage sludge and the waste material is sintered at a temperature to form the sintered lightweight aggregate. The waste material may comprise incinerator fly ash, incinerator filter dust, incinerator bottom ash, waste glass, blast furnace slag, cement kiln dust, and/or granite sawing residues, for example. The lightweight sintered aggregate may comprise from about 2% calcium to about 10% calcium, by dry weight. Preferably, the lightweight sintered aggregate comprises from about 3% to about 6% calcium, by dry weight. The lightweight sintered aggregate may be chemically inert.

In accordance with another embodiment of the invention, a pyroprocessed aggregate comprises sewage sludge from a waste water treatment facility and a non-coal combustion ash, silicoaluminous waste material. The aggregate may be sintered or vitrified. The aggregate may be a normal weight or lightweight aggregate.

In accordance with another embodiment, a pyroprocessed aggregate consists of sewage sludge. The sewage sludge may comprise less than 40% organic material, by weight.

In accordance with another embodiment, a method for producing an aggregate is disclosed comprising mixing sewage sludge from a waste water treatment facility and furnace bottom ash ("FBA") from a coal-burning facility, agglomerating the mixture to form an agglomerate, and pyroprocessing the agglomerate to form an aggregate. In accordance with another embodiment, a pyroprocessed aggregate is disclosed comprising sewage sludge from a waste water treatment facility and furnace bottom ash from a coal burning facility.

In accordance with another embodiment of the invention, a method for producing an aggregate is disclosed comprising reducing a moisture content of sewage sludge from a wastewater treatment facility to a level to allow agglomeration, agglomerating the sewage sludge, and pyroprocessing the agglomerate to form an aggregate.

In accordance with another embodiment, a method for producing an aggregate is disclosed comprising milling at least one of clay or shale, removing at least some of the water in sewage sludge from a wastewater treatment facility, and mixing the sewage sludge with the clay or shale. The mixture is pelletized and the pellets are pyroprocessed to form an aggregate, in a rotary kiln. The mixture of the sewage sludge and the clay or shale may be wet milled.

In accordance with another embodiment, a pyroprocessed aggregate is disclosed comprising sewage sludge from a waste water treatment facility and slate, lime, limestone, dolomite, and/or gypsum. In accordance with another embodiment, a process for producing aggregates is disclosed comprising mixing sewage sludge from a waste water treatment facility with slate, lime, limestone, dolomite, and/or gypsum. The mixture is agglomerated to form an agglomerate. The agglomerate is then pyroprocessed to form an aggregate.

In accordance with another embodiment, a method for producing an aggregate is disclosed comprising mixing a first material, which may comprise pulverized fuel ash from coal combustion, coal, clay, shale, slate, granite sawing residues, waste glass, and/or furnace bottom ash, with a second material, which may comprise incinerator fly ash, cement kiln dust, incinerator filter dust, blast furnace slag, limestone, gypsum, dolomite, and/or waste glass. The mixture is agglomerated to form an agglomerate and the agglomerate is pyroprocessed to form an aggregate. The first material may comprise less than about 3% by dry weight calcium and the second material may comprise more than about 9% calcium, by dry weight.

In accordance with another embodiment of the invention, a method for producing an aggregate is disclosed comprising mixing sewage sludge from a waste water treatment facility and incinerator residues from a municipal solid waste incinerator, agglomerating the mixture to form an agglomerate, and pyroprocessing the agglomerate to form an aggregate. The incinerator residues may comprise incinerator bottom ash, incinerator fly ash, and/or incinerator filter dusts.

In accordance with another embodiment of the invention, a method for producing an aggregate is disclosed comprising mixing a first material, which comprises: pulverized fuel ash from coal combustion or clay, with one or more of the following second materials: slate, lime, limestone, dolomite, gypsum, blast furnace slag, incinerator fly ash, incinerator filter dust, or cement kiln dust. The mixture is agglomerated to form an agglomerate and the agglomerate is pyroprocessed to form an aggregate.

In accordance with another embodiment, a pyroprocessed aggregate is disclosed comprising a first material, which may be pulverized fuel ash from coal combustion and/or clay, and a second material, which may be slate, lime, limestone, dolomite, gypsum, blast furnace slag, incinerator fly ash, incinerator filter dust, and/or cement kiln dust.

BRIEF DESCRIPTION OF THE FIGURES

FIG. 9 is a graph of density (g/cm$^3$) versus pyroprocessing temperature (° C.) for sewage sludge and mixtures of sewage sludge and waste glass, in accordance with an embodiment of the invention;

FIG. 10 is a graph of density (g/cm$^3$) versus pyroprocessing temperature (° C.) for sewage sludge (Sample Y) and mixtures of sewage sludge and granite sawing residues, in accordance with an embodiment of the invention;

FIG. 11 is a graph of density (g/cm³) versus pyroprocessing temperature (° C.) for sewage sludge and mixtures of sewage sludge and slate, in accordance with an embodiment of the invention;

FIG. 12 is a graph of density (g/cm³) versus pyroprocessing temperature (° C.) for sewage sludge and mixtures of sewage sludge and limestone, in accordance with an embodiment of the invention;

FIG. 13 is a graph of density (g/cm³) versus pyroprocessing temperature (° C.) for sewage sludge and mixtures of sewage sludge and incinerator fly ash, in accordance with an embodiment of the invention; and FIG. 14 is a graph of density (g/cm³) versus pyroprocessing temperature (° C.) for sewage sludge and mixtures of sewage sludge and ground granulated blast furnace slag, in accordance with an embodiment of the invention.

DETAILED DESCRIPTION OF THE PREFERRED EMBODIMENTS

Figure 1:
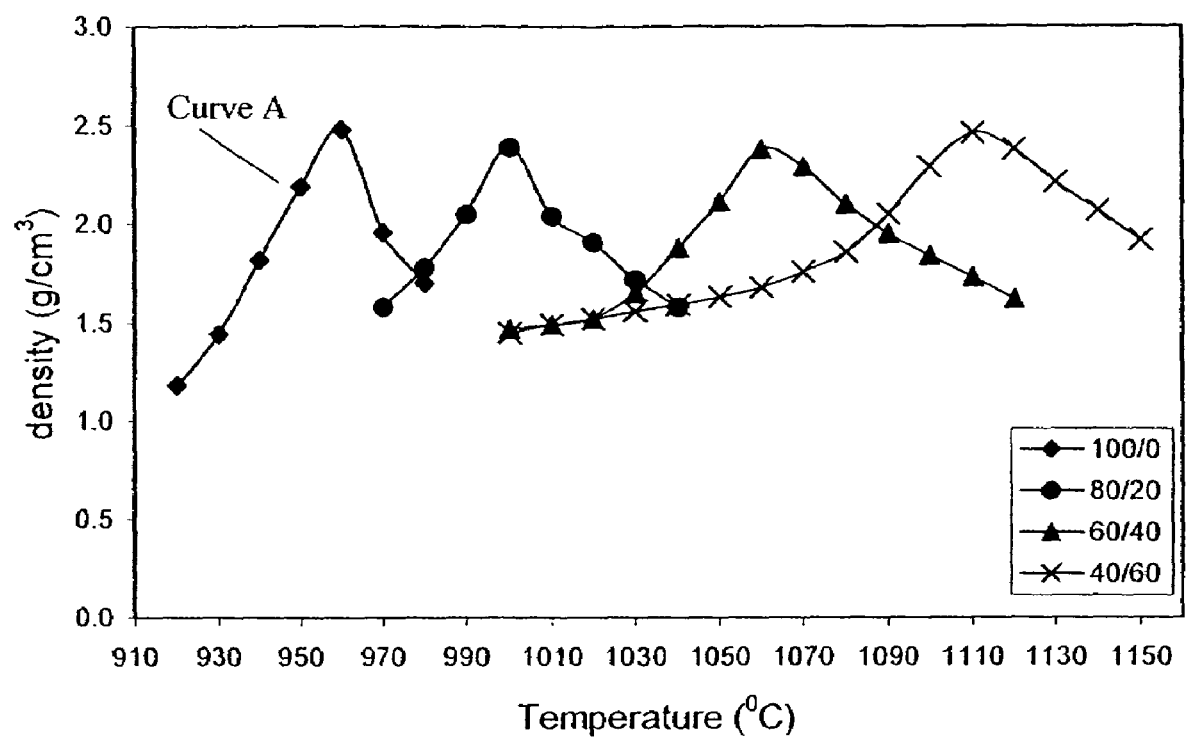
FIG. 1 is a graph of density (g/cm$^3$) versus pyroprocessing temperature (° C.) for sewage sludge (Sample X) and mixtures of sewage sludge and granite sawing residue, in accordance with an embodiment of the invention.

The behavior of a material when heated is primarily dependent on its composition, grain size, and mineral composition. In order to obtain a controlled densification with pyroprocessing temperature during production of sintered and vitrified products having desired densities, water absorptions, etc., a good ratio between fluxing materials and refractory minerals is required. Refractory minerals, such as silica and alumina, generally have high melting points. The presence of fluxing minerals, such as the alkaline earth metals calcium and magnesium, and the alkaline metals sodium and potassium, present in a material form of oxides, carbonates, or sulfates, lowers the melting point of silica and alumina and other refractory minerals in the material. If there is a high fraction of fluxing minerals in a material, there is a correspondingly lower fraction of the glass network-forming element silicon. The fluxing minerals promote sintering and melting at the temperature of the lowest eutectic point of the components in the mixture. In addition, the fluxing minerals, which have low viscosity and high mobility, assist in the formation of a sintered or vitrified product, depending on the temperatures involved, by liquid phase sintering.

Sewage sludge is a heterogeneous waste material whose composition is quite variable, depending principally on the characteristics of the wastewater influent entering a particular wastewater treatment plant and the treatment processes used for wastewater and sludge treatment processes. Sewage sludge is used in certain embodiments of the invention as the initial raw material for the production of pyroprocessed aggregates. Sewage sludge from two different treatment plants has been subjected to aggregate production processing in accordance with embodiments of the invention. Sewage sludge samples from one waste water treatment facility (Sample X, discussed in Example 1, below), comprised, in part, about 16.02% silica ($SiO_2$), 6.83% alumina ($Al_2O_3$), and 20.28% calcium oxide (CaO), by dry weight. Sample Y, also discussed in Example 1, below, comprised, in part, about 31.24% silica ($SiO_2$), 6.22% alumina ($Al_2O_3$), and 12.12% calcium oxide (CaO), by dry weight. These samples contained high amounts of the alkali earth metals calcium, which lower the melting point of the remaining compounds in the sludge. Densification therefore occurs at lower temperatures than the melting points of the refractory minerals silica and alumina. In addition, the calcium components act as fluxes, assisting in the formation of a sintered or vitrified product by liquid phase sintering. Whether a mixture is sintered or vitrified depends on the pyroprocessing temperature and the composition of the mixture. The fluxing minerals melt to form a low viscosity, high mobility liquid that absorbs and dissolves the remaining refractory minerals very rapidly. Furthermore, the mobility of the silicate melt is increased by the presence of volatile components in the sludge. This liquid formation is responsible for an accelerated densification behavior of this type of sewage sludge with increasing pyroprocessing temperature.

Sewage sludge samples from a second wastewater treatment facility had low concentrations of these fluxes. Sample Z, discussed below in Example 4, is an example of a low calcium sewage sludge having a partial composition of 3.20% calcium oxide (CaO), 3.80% aluminum oxide ($Al_2O_3$), and 39.50% silicon oxide ($SiO_2$), by dry weight. Densification took place at higher temperatures and over a wider temperature range, due to the higher concentrations of refractory minerals, such as silica.

In accordance with an embodiment of the invention, a pyroprocessed aggregate comprising 100% sewage sludge and a method for producing such an aggregate are disclosed. In addition, it has been found that better control of aggregate production may be attained by mixing the sewage sludge with an additive to modify the composition of the sewage sludge and alter its behavior during pyroprocessing. In accordance with other embodiments, certain waste and natural additive materials are therefore mixed with sewage sludge. The selection of the additional material depends on the composition of the sewage sludge. Preferably, the material is chosen so that the resulting aggregate has a calcium content of from about 2% to about 10%, by dry weight. More preferably, the calcium content is from about 2% to about 6%, by dry weight.

In one example of an embodiment, sewage sludge having a high calcium content, such as a calcium content higher than 10% by dry weight, for example, is mixed with low calcium silicoaluminous materials ("LCSAMs") having a calcium content less than that of the sewage sludge, in order to modify the composition of the sewage sludge and, therefore, its densification behaviour during pyroprocessing. The high calcium silicoaluminous sewage sludge may have a calcium content greater than 10% and the LCSAM may have a calcium content of less than about 10%, by dry weight, for example. The LCSAMs are also referred to in this embodiment as Group A additives or materials. LCSAMs include waste materials, such as waste glass ("WG"), furnace bottom ash ("FBA"), and certain mining wastes, such as granite sawing residues ("GSR"). LCSAMs also include the natural material slate.

The addition of LCSAMs to high calcium sewage sludge has been found to 1) delay the densification of the material, and/or 2) increase the temperature range between the initial softening, sintering, and melting of the aggregates, by providing a lower mobility and higher viscosity melt from the LCSAMs. This has been found to provide better control of the aggregate production process as compared to the processing of the 100% high calcium sewage sludge.

In another example of embodiment, sewage sludge having a low calcium content is mixed with high calcium silicoaluminous materials ("HCSAMs"), which are referred to in this embodiment as Group B additives or materials. Low calcium sewage sludge may have a calcium content of less than 3% and HCSAMs may have a calcium content of greater than 9%, by dry weight. HCSAMs in this embodiment include, for example: 1) the wastes: municipal solid waste ("MSW") incineration residues, cement kiln dusts ("CKD"), and blast furnace slag; and 2) the natural materials: limestone, gypsum, and dolomite. MSW incineration residues include air pollution control residues and incinerator bottom ash ("IBA"). Air pollution control residues include incinerator fly ash and incinerator filter dust.

The addition of HCSAMs to low calcium sewage sludge has been found to 1) reduce the temperature range over which the aggregates containing sewage sludge can be pyroprocessed; 2) provide a liquid melt that accelerates sintering and/or vitrification; and 3) enable production of aggregates with selected characteristics (such as density, for example), dependent upon temperature and composition.

Waste glass comprises considerable amounts of fluxing components, such as calcium and sodium (9% and 12% by dry weight, respectively), and refractory minerals, such as silica (71.7% by dry weight). Waste glass may therefore be both a Group A and a Group B additive, depending on the composition of the sewage sludge. In other words, the waste glass can lower the calcium content of high calcium sewage sludge or raise the calcium content of low calcium sewage sludge.

In another example of an embodiment, synthetic aggregates from mixes of at least one LCSAM with at least one HCSAM, are produced. In one example, the LCSAMs comprise less than 3% calcium while the HCSAMs comprise more than 10% calcium, by dry weight. It has been found that the mixtures of the LCSAMs and the HCSAMs provide a good ratio between refractory and fluxing minerals, enabling controlled pyroprocessing. LCSAMs in this embodiment include, for example, the wastes: pulverized fuel ash from a coal burning facility and the other LCSAMs discussed above, as well as clay, shale, and slate. The clay may be bentonite and/or kaolin, for example. The HCSAMs in this embodiment are the same as those discussed above, except that MSW incinerator bottom ash is not included. The addition of HCSAMs to LCSAMs aims to provide a mixture with the desirable composition of the appropriate proportion of the fluxing to the refractory minerals, in order to achieve a better control of the production process to manufacture aggregates of the desired properties.

In another embodiment, by controlling the proportions of the sewage sludge to the second material/additive and the pyroprocessing temperature, a range of densities, porosities, and water absorptions of the synthetic aggregates can be obtained.

FIG. 1 is a graph of density (g/cm$^3$) versus sintering temperature (° C.) for aggregates comprising sewage sludge (sample X in Example 2, below) and aggregates comprising mixtures of sewage sludge and granite sawing residues, over a range of about 920° C. to about 1,150° C. Curve A, corresponding to aggregates comprising 100% SS, shows that as temperature increases from about 920° C. to about 960° C., density increases from a low of about 1.2 g/cm$^3$ to a maximum density of about 2.5 g/cm$^3$. As temperature increases from 960° C. to 980° C., density decreases from the maximum density of about 2.5 g/cm$^3$ to 1.7 g/cm$^3$. Aggregates with densities of 2.0 g/cm$^3$ and below are referred to as lightweight aggregates while aggregates with densities above 2.0 g/cm$^3$ are referred to as normal weight aggregates.

Density increases with temperature from 920° C. to 960° C. because as the product sinters, the fluxing agents in the sewage sludge melt to form a liquid phase that fills pores between particles in the sewage sludge by capillary action. Density increases as pores are filled and the volume of the sample decreases. In addition, smaller particles in the liquid phase diffuse toward the larger particles. The melted materials form a rigid, glassy, amorphous skeleton or matrix upon hardening. As the processing temperature increases, more of the compounds in the sewage sludge melt, substantially eliminating all the pores and forming a more glassy, crystalline solid matrix. At the temperature of maximum densification, essentially all of the pores are filled and the product is vitrified.

Density rapidly decreases with temperature from 960° C. to 980° C. because further temperature increases result in sample melting and bloating. Bloating is caused by the entrapment of gases in the melted liquid phase, resulting from volatilization of certain components of the sample. The entrapped gases form pores.

As shown in FIG. 1, sewage sludge sinters rapidly over a very narrow temperature range. For example, in order to produce a sintered lightweight aggregate comprising 100% sewage sludge having a density in a range of about 1.4 g/cm$^3$ to about 1.8 g/cm$^3$, the sintering temperature must be within a range of 930-940° C., which is only 10° C. wide. In addition, variations in the composition of a given sample of sewage sludge cause significant variations in the behavior of the sewage sludge sample during heating. The relationship between temperature and density for different sewage sludge samples may therefore vary widely. Consequently, it is very difficult to achieve a sewage sludge end product having desired characteristics of density, porosity, water absorption, etc. The inability to control the densification behavior of sewage sludge having similar composition to this sample (high calcium) with temperature would be a significant obstacle in the production of aggregates of required properties in large-scale production.

The low calcium silicoaluminous materials (LCSAMs) used in embodiments of the invention comprise more silica and less calcium than sewage sludge. As described above, the sewage sludge sample (Sample X) used in Examples 1 and 2, below, comprised about 16.02% silica ($SiO_2$), 6.83% alumina ($Al_2O_3$), and 20.28% calcium oxide (CaO), by dry weight. The natural LCSAM clays (bentonite and kaolin, for example), shale, and slate comprise from about 48% to 58% silica ($SiO_2$), from about 18% to about 29% aluminum ($Al_2O_3$), and less than about 3% calcium oxide (CaO), by dry weight. Granite sawing residues ("GSR"), which is an example of a mining waste used in certain embodiments of the invention, comprise about 65% silica ($SiO_2$), about 15% alumina ($Al_2O_3$), and about 2.6% calcium oxide (CaO), by dry weight. Waste glass comprises about 72% silica ($SiO_2$), about 2% alumina ($Al_2O_3$), and about 9% calcium oxide (CaO), by dry weight. Waste glass also comprises about 12% sodium oxide ($Na_2O$) by dry weight, which is also a fluxing compound, so it may be used either to increase or decrease the amount of fluxing agents in sewage sludge. Furnace bottom ash ("FBA"), which has the same composition as pulverized fuel ash from coal combustion ("PFA"), comprises about 52% silica ($SiO_2$), about 26% alumina ($Al_2O_3$), and about 2% calcium oxide (CaO), by dry weight. The additional components of these LCSAMs are given in the Examples, below.

As shown in FIG. 1, in an 60%/40% sewage sludge ("SS")/granite sawing residues ("GSR") mix, for example, in order to produce a sintered lightweight aggregate having a density of from about 1.5 g/cm$^3$ to about 1.8 g/cm$^3$, the sintering temperature may be within a range of about 30° C. (from about 1,010° C. to about 1,040° C.). In a 40%/60% SS/GSR mix, similar densities may be achieved at a temperature within a 65° C. range of from about 1,010° C. to about 1,075° C. In addition, increasing the GSR concentration to 60% delays sintering as the maximum density is reached at about 1,110° C. (in contrast to 960° C. for 100% SS and 1,060° C. for 60%/40% SS/GSR). It is expected that further increases in GSR to 80% and above would result in lightweight aggregates having densities of from about 1.5 g/cm$^3$ to about 1.8 g/cm$^3$ over a wider temperature range than the 40%/60%

SS/GSR mix. The broader temperature ranges facilitate production of aggregates of desired density and other properties, despite variations in composition of the SS. FIG. 1 is based on the results of Example 2, below.

Figure 2:
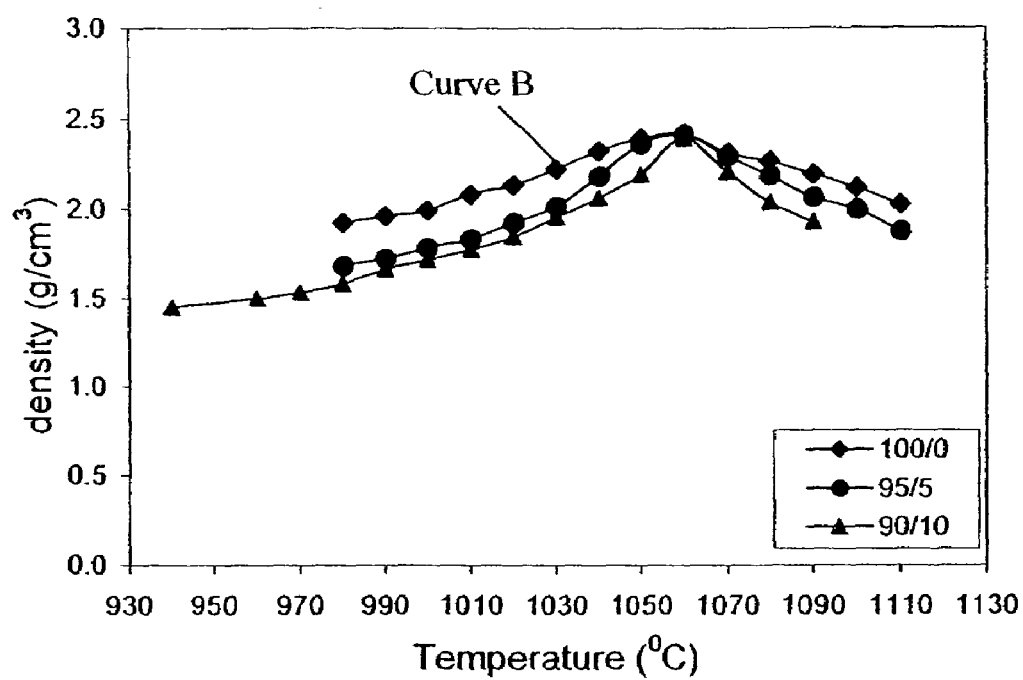
FIG. 2 is a graph of density (g/cm$^3$) versus pyroprocessing temperature (° C.) for sewage sludge and mixtures of sewage sludge and cement kiln dust, in accordance with an embodiment of the invention.

FIG. 2 is a graph of density (g/cm$^3$) versus sintering temperature (° C.) for aggregates comprising sewage sludge (Sample Z in Example 4, below) and aggregates comprising mixtures of sewage sludge and cement kiln dusts, over a range of about 980° C. to about 1,110° C. Curve B, corresponding to 100% sewage sludge, shows that as temperature increases from about 980° C. to about 1060° C., density increases from a low of about 1.9 g/cm$^3$ to a maximum density of about 2.4 g/cm$^3$. As temperature increases from 1060° C. to 1110° C., density decreases from the maximum density of 2.4 g/cm$^3$ to 2.0 g/cm$^3$. The aggregates having densities above 2.0 g/cm$^3$ are normal weight aggregates.

As shown in FIG. 2, sewage sludge exhibits a delayed densification and a broad temperature interval between the initial material softening, sintering and melting, due to the high amounts of refractory components in the sewage sludge. In this example, the temperatures investigated produced normal weight aggregates having densities between 2.0 g/cm$^3$ and 2.4 g/cm$^3$ over a wide temperature range of 110° C. (1000-1110° C.). In order to accelerate the densification behavior of the material to produce both lightweight and normal weight aggregates within a temperature range providing predictability and production control, a high calcium silicoaluminous, Group B material ("HCSAM") is added to the sewage sludge. In this example, the HCSAM is cement kiln dusts ("CKD"). Since CKD comprises a significant amount of CaO (63% by weight), only a small amount of CKD is needed to have an accelerating effect. An addition of 5% CKD in the sewage sludge results in the production of lightweight aggregates having densities of from about 1.7 g/cm$^3$ to about 2.4 g/cm$^3$, when pyroprocessed in the same temperature range of the 100% sewage sludge mixture. An addition of 10% CKD in the sewage sludge results in the production of lightweight aggregates having densities as low as 1.4 g/cm$^3$ and normal weight aggregates having densities of up to about 2.4 g/cm$^3$, between the pyroprocessing temperatures of 940° C. to 1060° C. Further additions of CKD are not preferred because it may further accelerate the densification of the mixture, which may be an obstacle in controlling the production process in a predictable manner in large scale aggregate production.

In a method in accordance with an embodiment of the invention, an aggregate is formed by mixing predetermined amounts of sewage sludge and a second material, which may be a LCSAM or a HCSAM, depending on the composition of the sewage sludge, agglomerating the mixture, and pyroprocessing the agglomerate at a selected temperature. As discussed above, the LCSAM has less calcium-containing components than the original sewage sludge, while the HCSAM has more calcium than the sewage sludge. The temperature may be selected based, at least in part, on the proportion of sewage sludge to the silicoaluminous material ("SAM"), and the desired density and other properties of the aggregate, such as water absorption and/or strength, based on data such as that graphically represented in FIGS. 1 and 2. A temperature that will cause sintering is preferred. The mixture is preferably agglomerated prior to sintering, to create agglomerates having a desired size and shape to form the sintered aggregate. Pelletization is a preferred agglomeration method. The sewage sludge may be dried prior to mixing with the second material. Alternatively, the sewage sludge may be added in wet form having the desirable moisture content to allow agglomeration.

Figure 3:
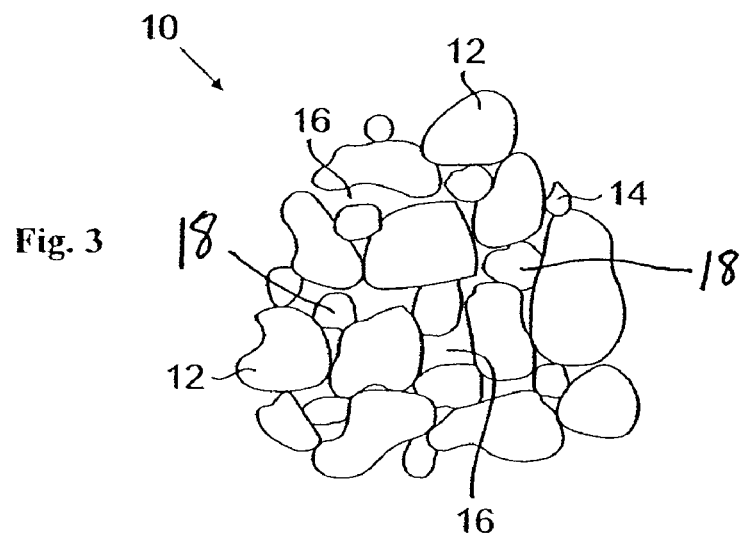
FIG. 3 is a schematic cross-section of an example of an agglomerate produced in accordance with processes of the invention.

FIG. 3 is an example of an agglomerate 10 comprising LCSAM particles 12, such as clay, shale, slate, granite sawing residue, waste glass, and furnace bottom ash, or HCSAM particles 12, such as cement kiln dust, blast furnace slag, limestone, gypsum and dolomite, and sewage sludge particles 14. Pores 16 are also shown. The agglomerate 10 may be pyroprocessed, for example sintered, to form an aggregate in accordance with an embodiment of the present invention. During pyroprocessing, fluxing compounds, such as calcium, sodium, potassium, and magnesium oxide, and other compounds with melting points below the processing temperature in the original grain particles of sewage sludge 14 and high or low SAM particles 12, melt and flow into the pores 16. If the SAM particles 12 are waste glass, which is a non-crystalline solid, densification occurs by fusing of softened glass particles by viscous sintering at temperatures that are generally much lower than the melting temperatures of other, crystalline SAM particles.

Figure 4:
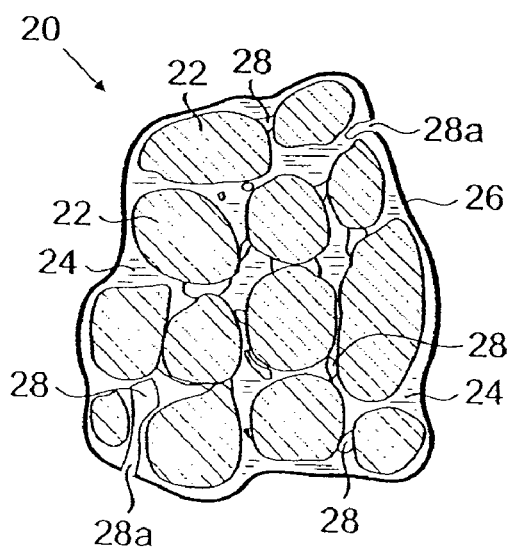
FIG. 4 is a schematic cross-sectional view of an example of a sintered aggregate, in accordance with embodiments of the invention.

FIG. 4 is a schematic cross-sectional view of an example of an aggregate 20 resulting from sintering the agglomerate 10, in accordance with an embodiment of the invention. The aggregate 20 comprises a mixture of sewage sludge and SAM. The agglomerate is sintered at a temperature that depends on the proportion of sewage sludge to SAM and the desired density and/or other characteristics. The sintered aggregate 20 comprises a plurality of grains 22 bonded to each other through a partly glassy and partly crystallized matrix 24, resulting from the melting and/or the crystallization of the components. The grains 22 may comprise silica, alumina, and other minerals with melting points above the processing temperature. The grains 22 fully or partially crystallize during sintering, providing an additional bond between the grains 22. The aggregate 20 preferably has a dense, continuous, relatively impermeable surface layer 26, resulting from coating of the agglomerates 10 with an inorganic material, as discussed further below. Internal pores 28, which may be channel-like, and small surface pores 28a, which may be microscopic, are also present. The surface pores may connect with the internal pores, enabling the aggregate 20 to absorb water. The degree of water absorption is indicative of the volume and connectivity of the pores.

Figure 5:
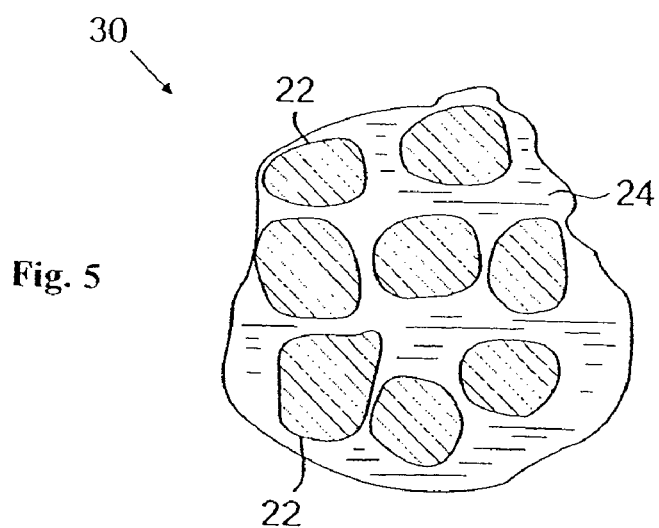
FIG. 5 is a schematic cross-section of an example of a vitrified aggregate, in accordance with embodiments of the invention.

FIG. 5 is a schematic cross-sectional view of an example of a vitrified aggregate 30, in accordance with another embodiment of the invention. The vitrified aggregate 30 comprises fewer grains 22 and a larger matrix 24 than the sintered aggregate of FIG. 4. Vitrification results from pyroprocessing of the agglomerate 10 at or above the temperature of maximum densification for the particular proportions of sewage sludge to SAM, where most of the components of the agglomerate melt.

Highly porous lightweight aggregates, having densities as low as about 1.2 g/cm$^3$ and water absorptions above about 40%, with very low strengths, as well as very strong, well-sintered lightweight aggregates with densities up to 2.0 g/cm$^3$, may be made in accordance with embodiments of the invention. Normal weight aggregates, with densities greater than about 2.0 g/cm$^3$, and up to about 2.6 g/cm$^3$, and water absorptions close to zero, may also be made in accordance with embodiments of the invention. Aggregate production with sewage sludge and SAMs, and among certain waste SAMs, present an advantageous reuse application.

Figure 6:
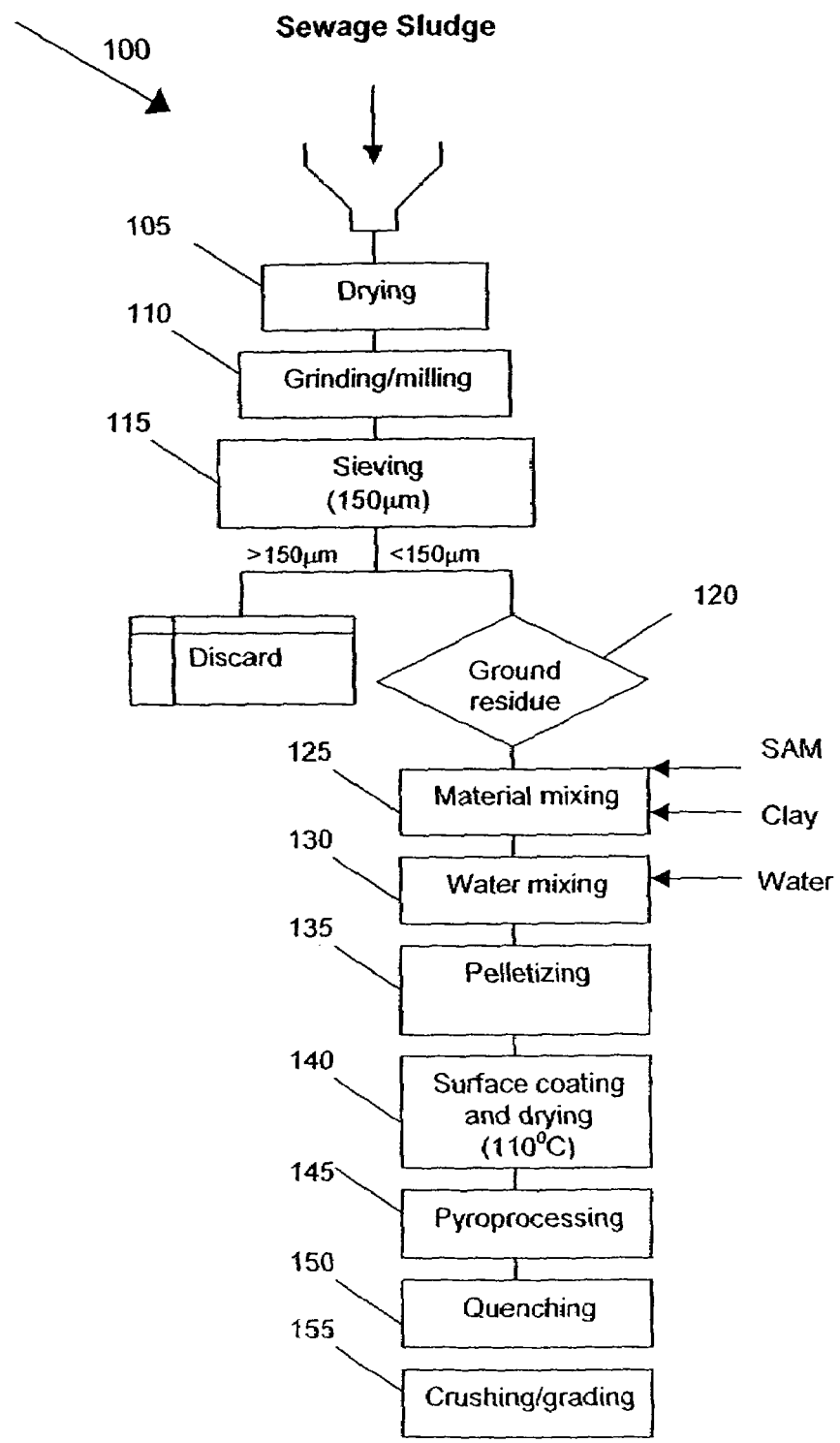
FIG. 6 is an example of a method for producing aggregates, in accordance with an embodiment of the invention.

FIG. 6 is an example of a method 100 of manufacturing aggregates in accordance with an embodiment of the invention. The sewage sludge is first dried, in Step 105. Sludge may be dried in an oven at 110° C. for 24 hours, for example. If the water content of the raw sludge is very high, the excess water is removed by filtering, gravity settling, flocculation, or precipitation, for example, before being dried in the oven. Lumps of dried sewage sludge are typically formed. The size of the lumps may then need to be reduced. A fine powder suitable for subsequent processing is preferably produced by dry milling or grinding, or by using a pestle and mortar, for example, in Step 110. In large-scale production, the dry solid cake may be ground to a powder by a hammer mill, for example. The ground sewage sludge powder is separated to remove large particles through a sieve, for example, in Step 115. Coarse particles, such as stones, rocks, or metals present in the sewage sludge are preferably removed for further processing, as well. Separation may take place by mechanically shaking the sewage sludge powder onto ASTM standard stainless steel mesh screens having openings of 150 microns or 80 microns, for example. The sewage sludge having particle sizes less than 150 microns is further processed.

Powders with fine particle size distributions (less than about 710 microns) have advantageous characteristics because the high surface area to volume ratio increases diffusion of small particles through the liquid phase to the larger particles, and because the powders are better distributed throughout the aggregate, with good packing densities.

Sewage sludge may also be used in its raw wet form, as long as the material has suitable moisture content to be directly mixed with the SAM, allowing further processing according to Steps 125-150 of FIG. 6, for example. Excess water content may again be removed by drying, filtering, and/or other processes, to reach a suitable moisture content before mixing with the additives. In this case, Steps 105-120 are not provided.

The ground sewage sludge powder from Step 120 is then mixed with the appropriate SAM in the form of powder having a fine particle distribution, in Step 125. Mixing may be batch or continuous. If the SAM has a coarse particle size distribution, it may be pre-ground in a hammermill or a ball mill, for example, using dry or wet milling techniques, before being added to the mixer with the sludge powder. Any amount of high or low calcium SAM may be added to the low or high calcium sewage sludge, respectively, for improved pyroprocessing performance. The preferred ranges of sewage sludge to SAM depend on whether the sewage sludge is high or low calcium sewage sludge. In accordance with an embodiment of the invention, clay, such as bentonite and kaolin, and/or shale are low calcium silicoaluminous materials mixed with sewage sludge. The clay may be milled, preferably by wet milling, in Step 125.

Preferably, from about 5% to about 95% high calcium sewage sludge is mixed with from about 95% to about 5% LCSAM, by dry weight of the mixture ("BDWM"). More preferably, from about 30% to about 70% high calcium sewage sludge is mixed with from about 70% to about 30% of the LCSAM, BDWM. In this range, the resulting aggregate has a calcium content of from about 6% to about 15%, by dry weight. More preferably, from about 30% to about 50% high calcium sewage sludge is mixed with from about 70% to about 50% of the LCSAM, BDWM. In this range, the resulting aggregate has a calcium content of from about 6% to about 10%, by dry weight. It has been found that the densification behavior of the mixture may be better controlled, enabling the production of aggregates with desired characteristics, when the calcium content of the aggregate is from about 2% to about 10%, and even better control may be obtained when the calcium content is from about 3% to about 6%, by dry weight.

Preferably, from about 99% to about 70% low calcium sewage sludge is mixed with from about 1% to about 30% HCSAM, BDWM. More preferably, from about 80% to about 90% low calcium sewage sludge is mixed with from about 20% to about 10% HCSAM, BDWM. These ranges provide aggregate calcium content similar to that discussed above.

A plastic binder, such as clay, may be added to enhance the physical bonding of individual particles with water during granulation, which is described in Step 125. The term "plastic binder" refers to a binder material having a high plasticity index. A plasticity index of at least 10 is preferred. The clay binder may comprise from about 5% to about 20% by dry weight of the mixture of SS, the SAM, and the clay binder. The amount of binder used may depend on the type and characteristics of the sewage sludge and the SAM, such as the plasticity of individual components in the mix.

After thoroughly mixing the powders, water is added to form a suitable consistency for agglomeration, in Step 130. The mixture preferably has a clay-like mixture, for example. The amount of water to be added is related to the amount and type of additive in the mixture. For example, if the proportion of sewage sludge to clay is about 80% sewage sludge ("SS") to 20% clay, by dry weight, the amount of water required has been found to be about 25% of the total dry weight of the SS/clay mixture. If the proportion is 60%/40%, then the amount of water required has been found to be about 28%, by dry weight. If the proportion is 20%/80%, then the amount of water required has been found to be about 32%, by dry weight. If sewage sludge is used in its wet form, and the mixture of SS/SAM and optionally clay have a suitable moisture content that allows further processing, no water needs to be added to the mixture.

The resulting mixture is agglomerated, in Step 135. Agglomeration is a particle size enlargement technique in which small, fine particles, such as dusts or powders, are gathered into larger masses, such as pellets. Preferably, the mixture is agglomerated by pelletization, wherein fine particles dispersed in either gas or liquid are enlarged by tumbling, without other external compacting forces. A pelletizing rotating drum or disc may be used, for example. The strength of the resulting pellets depends on the properties of the particles, the amount of moisture in the medium, and mechanical process parameters, such as the speed of rotation and angle of tilt of the rotating drum, as is known in the art. An example of the use of a rotating drum is described in the examples, below. The resulting pellets are nearly spherical or slightly angular, and vary in color from light to dark brown, depending on the carbon and iron content in the mixes. They may range in size from about 3 mm to about 40 mm, for example. As discussed above, FIG. 3 is an example of a pellet 10. Extrusion may be used instead of pelletization. Extrusion results in a brick-like material that can be crushed into smaller particles after hardening. Alternatively, compaction may be used to produce cylindrical agglomerates, such as tablets or other shapes.

The agglomerated mixture is optionally surface coated and then dried, in Step 140. The amount of inorganic material used may be small. The pellets may be coated with an inorganic material that will not melt at the sintering temperature. The pellets may be coated by sprinkling the dust on them or by rolling the pellets in the dust. The use of a coating material depends on the characteristics of the sewage sludge and the selected additive. If the sewage sludge is high calcium sewage sludge, the inorganic material may comprise a LCSAM from Group A, such as granite sawing residues or furnace bottom ash in the form of dust, clay, ground shale, and slate, could also be used, for example. If the sewage sludge is low calcium sewage sludge, the inorganic material may comprise an HCSAM from Group B, such as cement kiln dusts, incinerator fly ash, incinerator filter dust, limestone, gypsum, and ground granulated blast furnace slag ("GGBS"), for example.

Covering the pellet surface with a thin layer of non-sticking material results in formation of a skin on the pellet surface that decreases clustering of the pellets, enhances the pellet strength, and creates a thin dense outer skin on the aggregate, as shown in FIG. 4, for example. If a clay binder is added to the mixture, coating of the pellet surface is not needed to enhance pellet integrity or to form a coating, since the clay provides improved internal bonding. Coating is an option, however. Drying may take place at about 110° C. in an oven, for example. Drying is preferably provided because pyroprocessing wet pellets in a kiln may result in cracking and exploding of the pellets due to rapid temperature changes.

The coated and dried pellets are pyroprocessed, in Step 145. The pyroprocessing takes place at a temperature of from about 1000° C. to about 1350° C., for example, depending on the composition of the mixture and the desired properties of the aggregate, as discussed in more detail, below. The pyroprocessing may be sintering, which takes place at temperatures below the temperature of maximum densification, or vitrification, which takes place at the temperature of the maximum densification and above. The pyroprocessing preferably takes place in a rotary kiln. Sintering results in increased strength and density of formerly loosely bound particles, through the formation of interparticle bonds. Vitrification results in increased strength at the temperature of maximum densification. As vitrification progresses at higher temperatures, however, density and strength decrease due to bloating of the glassy amorphous matrix, as discussed above.

The pyroprocessed aggregate may be quenched in water, in Step 150. Quenching cools the pellets, stopping the melting. If quenched, the resulting aggregate 20 will have a more amorphous matrix 24 than when air cooled, which allows recrystallization. It is known in the art that quenching improves the hardness, toughness, and wear resistance of the pyroprocessed aggregates. The water may be at room temperature (about 30° C.), for example.

After pyroprocessing and quenching, if provided, the pellets may be crushed and graded to the desired aggregate size, in Step 155. Preferably, the coarse aggregates range from about 4.75 to about 19 mm. Smaller aggregates may also be used as fine aggregates in concrete, for example.

Due to pellet shrinkage during pyroprocessing, if the pellets ranged in size from about 3 mm to about 40 mm, the pyroprocessed aggregates may range in size from about 2 mm to about 30 mm, for example. Appropriate size ranges for the graded aggregates may be about 4 mm to about 8 mm, which may be used in filtration applications, and about 12 mm to about 19 mm, which may be used in concrete. Smaller aggregates (down to about 2 mm) may also be used as fine aggregates in concrete, for example.

It is believed that as a result of pyroprocessing in accordance with embodiments of the invention, the aggregates are chemically inert against most substances under normal environmental conditions.

Figure 7:
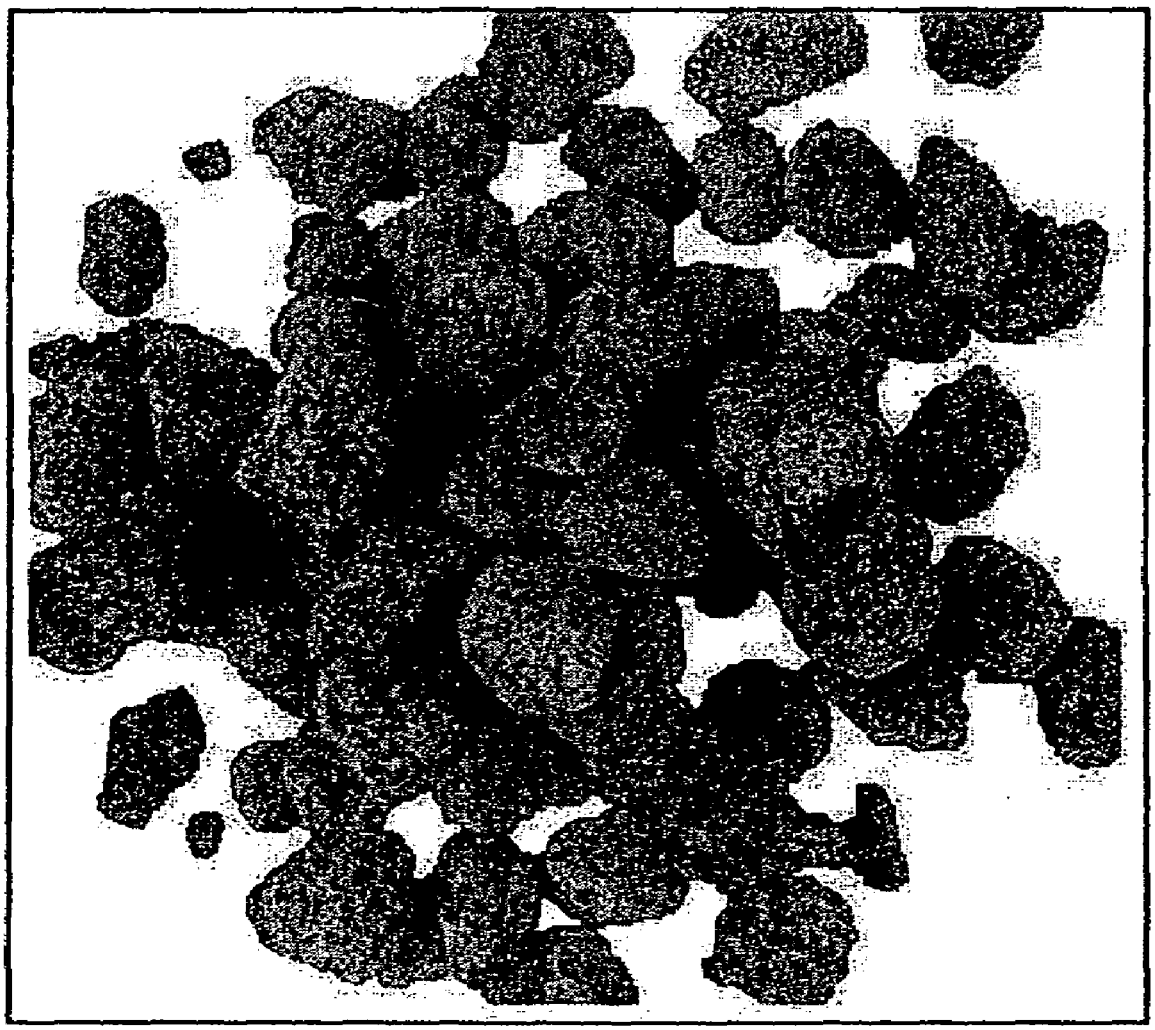
FIG. 7 is a photograph of an example of sintered aggregates, in accordance with embodiments of the invention.

FIG. 7 is an example of plurality of sintered aggregates made in accordance with embodiments of the invention, from mixes containing 80%/20% of SS/slate pyroprocessed at 990° C.

Figure 8:
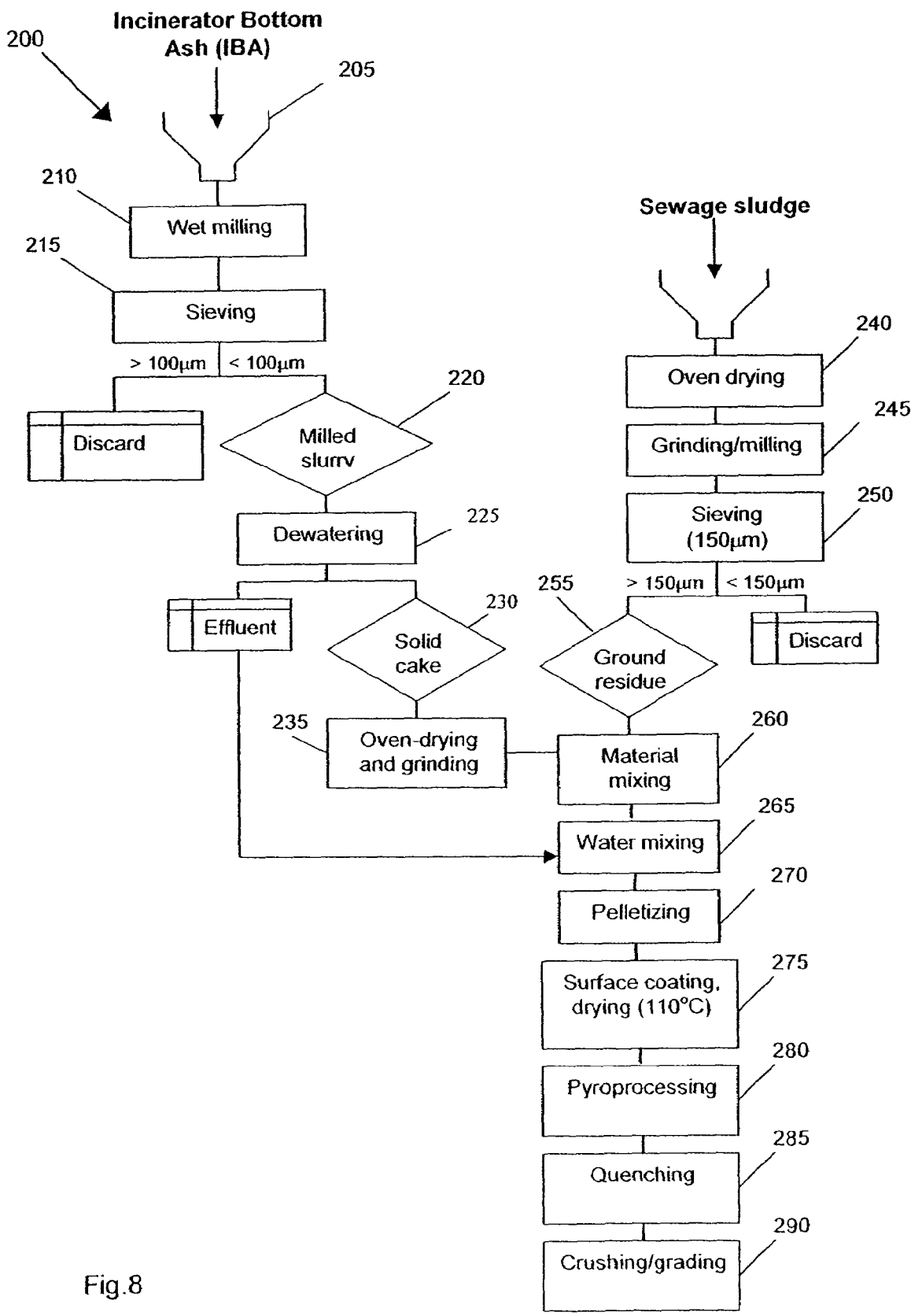
FIG. 8 is an example of another method for producing aggregates, in accordance with another embodiment of the invention.

FIG. 8 is an example of a method 200 of manufacturing aggregates in accordance with an embodiment of the invention, in which specific SAMs having coarse particle distributions, are wet milled before mixing with the sewage sludge. Additives used in the present invention that have such distributions include IBA, FBA, and waste glass.

IBA is added to a barrel of a ball mill in Step 205 and is milled with water, in Step 210. Milling is used to reduce the particle size distribution of the IBA to a distribution that is fine, to improve pyroprocessing. Powders with fine particle size distributions have advantageous characteristics because the high surface area to volume ratio increases diffusion of small particles through the liquid phase to the larger particles and because the powders are better distributed throughout the aggregate, with good packing densities. The resulting particles preferably have a mean particle size of about 45 microns and less, for example. Wet milling is preferred because it has been found to provide a more uniform particle size distribution. In addition, the liquids used in the wet milling process tend to break up agglomerates and reduce welding of powder particles. Alternatively, the IBA may be dry milled in a hammer mill, for example. While the method 200 of FIG. 8 will be described with respect to the use of IBA, it is understood that if FBA or waste glass are used, they are preferably milled, as well.

The IBA may be wet milled in a closed cylindrical container, for example, wherein grinding spherical media such as wet mill balls, in a liquid medium, such as water or alcohol, apply sufficient force to break particles suspended in the medium. Motion may be imparted to wet ball mills by tumbling, vibration, planetary rotation, and/or agitation. The most important variables controlling the powder particle size distribution is the speed of milling (rpm), the milling time, the amount of grinding media, the initial particle size of the raw material, and the desired product size. For most efficient results, the mill should be at least half filled with grinding media. The milling media may be high density, aluminum spheres, for example, with a total weight of about four times that of the solids. Small grinding media are recommended for optimum milling. When aluminum or steel balls are used, preferred sizes range between ½ and ⅝ inch. About twice as much liquid as solids is preferably provided. Milling may take place for about 8 hours, for example.

The wet milled IBA is separated to remove large particles through a sieve, for example, in Step 215. If the particles are too big, they will not form homogenous pellets. Separation may take place in multiple steps. For example, the IBA may be mechanically shaken over ASTM standard stainless steel mesh screens having openings of 355 microns or 150 microns, for example. The IBA having particle sizes less than 150 microns is further processed. The greater than 150 micron fraction may be separated into different types of materials that may be reused as a SAM additive, as waste glass.

The resulting milled slurry of the finer fraction from Step 220 is dewatered in Step 225. Preferably, all the free water is removed. The water removed is referred to as effluent, which may be used in Step 265, as discussed further below. Water may be removed in a filter press or other filtration apparatus, for example. Dewatering results in formation of a solid moist cake residue, in Step 230.

The cake is dried and ground in Step 235. This step converts the cake into a powder. The cake may be dried in an oven at 110° C., for example. The powder may be ground by a mortar and pestle, for example. In large-scale production the dry solid cake may be ground to a powder in a mixer with blades or a dry hammer mill, for example, so that the dry milled IBA solid cake may be simultaneously ground to powder and consistently mixed with the raw additives which are also in the form of a powder.

Before mixing the milled IBA, with the sewage sludge, the sludge is dried, in Step 240. Sludge may be dried in an oven at 110° C. for 24 hours, for example. The solid cake produced is ground into a powder, in Step 245. The powder may be produced by dry milling or grinding, or by using a pestle and mortar, for example. The sludge powder is passed through 150 micron or 80 micron sieves to remove coarse particles, in Step 250. The less than 150 micron fraction of Step 255 is thoroughly mixed with the milled IBA powder in, Step 260. Water is added to the mixture before the wet clay-like mixture is pelletized, in Step 265. The water may be some or all of the effluent produced from the dewatering Step 225, discussed above. Steps 265-285 correspond to Steps 130-155 in FIG. 6. Alternatively, sewage sludge may be mixed in its wet form with the IBA. However, the appropriate moisture content is required to avoid further addition of water for granulation of the mixture. In this case, Steps 240-255 are not preferred.

Alternative processing may be used when the sewage sludge with the IBA are wet milled together in a ball mill, to produce a slurry. Then the milled slurry is sieved through a series of sieves and dewatered in a filtration apparatus to form a clay-like solid cake. The solid cake is then dried at 110° C. and ground to a fine powder, which is further pelletized in the presence of water and pyroprocessed to form aggregates. The milled slurry formed from wet milling both materials may also be dewatered to the required moisture content to allow direct pelletization of the mixture. Formed pellets are dried at about 110° C. before entering the pyroprocessing stage in the kiln.

It is noted that while the sewage sludge is completely dried in the examples of FIG. 6 and FIG. 8, the sewage sludge may be only partially dried and mixed with a SAM, including milled clay or shale. A moisture content for the mixture of sewage sludge and SAM of less than about 25% by dry weight, is preferred to enable agglomeration of the mixture, such as by pelletization. If the sewage sludge is not completely dried, then it might not be necessary to add water prior to agglomeration.

The following experiments have been performed:

Example 1

In this example, synthetic aggregates were produced comprising sewage sludge ("SS") and waste glass ("WG"). The average chemical compositions (major oxides) of the three different SS samples used in this example are given in Table A, below. Table B, below, shows the minor and trace constituents present in the three samples. Sample X and Sample Y were obtained from the same facility about six months apart, while Sample Z was obtained from a second facility. The calcium oxide content of Sample X is 20.28% by dry weight; the calcium oxide content of Sample Y is 12.12% by weight; and the calcium oxide content of Sample Z is 3.20% by dry weight. Samples X and Y are considered to be high calcium SS and Sample Z is low calcium SS. The average chemical composition of WG used is also shown in Table A. The WG was made from soda-lime glass, which accounts for about 90% of the glass produced in the United States. It consists mainly of silicon dioxide (71.7% by dry weight), sodium oxide (12.1% by dry weight), and calcium oxide (9.4% by dry weight) with other minor components, such as aluminum and magnesium oxides. The composition of the glass causes the material to densify by liquid phase sintering at lower temperatures than other glasses currently used to produce ceramics, therefore reducing energy production costs. Depending on the composition of the SS, WG can be used as both a LCSAM to increase the densification temperature range and also as a HCSAM that will act as a fluxing agent to accelerate densification. For example, WG may be used with sewage sludge samples X, Y, and Z to produce synthetic aggregates.

TABLE A

CHEMICAL ANALYSIS OF SS AND WG

| | Weight (%) | | | |
|---|---|---|---|---|
| Constituent | SS (Sample X) | SS (Sample Y) | SS (Sample Z) | Waste glass |
| $SiO_2$ | 16.02 | 31.24 | 39.50 | 71.7 |
| $Al_2O_3$ | 6.83 | 6.22 | 3.80 | 2.1 |
| $Fe_2O_3$ | 2.35 | 6.33 | 6.70 | 0.3 |
| CaO | 20.28 | 12.12 | 3.20 | 9.4 |
| MgO | 3.00 | 2.25 | — | 2.8 |
| $Na_2O$ | 0.30 | 0.58 | 0.69 | 12.1 |
| $K_2O$ | 0.59 | 0.32 | 0.28 | 0.9 |
| $TiO_2$ | 0.38 | 0.41 | 0.47 | 0.1 |
| $P_2O_5$ | 3.90 | 2.64 | 2.43 | 2.43 |
| $SO_3$ | 1.85 | 2.11 | 2.87 | 2.87 |

TABLE B

MINOR AND TRACE CONSTITUENTS IN SEWAGE SLUDGE

| | mg/kg | | |
|---|---|---|---|
| Constituent | Sample X | Sample Y | Sample Z |
| As | 30 | 20 | 20 |
| Ba | 400 | 300 | 300 |
| Cl | 940 | 1200 | 1300 |
| Cr | 700 | 900 | 900 |
| Cu | 300 | 200 | 300 |
| Mn | 90 | 100 | 100 |
| Ni | 100 | 100 | 100 |
| Pb | 200 | 300 | 300 |
| Rb | 20 | 20 | 20 |
| Sr | 300 | 100 | 100 |
| Y | 10 | 100 | 10 |
| Zn | 1200 | 2300 | 3400 |
| Zr | 100 | 90 | 100 |

SS sample X and WG were subjected to processing described below. In this example, WG was added to dried SS powder before pelletization.

Sample X was oven dried at 110° C. for 24 hours. The resulting dry cake was added to a ball mill for grinding to powder. The mill was a Pascal Engineering Co., Ltd., Model No. 21589, containing about 2.172 kg of ¾ inch (19.05 mm), high density, alumina sphere grinding media. The ground powder was sieved through a 150 micron sieve to remove coarse particles.

The WG used was derived in part from bottles and window glass separated from raw IBA. This WG was washed and oven-dried overnight at 110° C. The WG was then crushed in a jaw crusher and separated to reduce the particle sizes to between 2 mm to 6 mm and then ground in a tungsten carbide Tema mill, available from Gy-Ro, Glen Creston Ltd., Brownfields, England by the use of vibrating rings, so that ninety five percent of the volume ($d_{95}$) had a particle size less 710 microns. It was again dry milled in a carbide mill for an additional 4 minutes to further reduce the particle size distribution. This fine WG fraction was used in this Example. The $d_{50}$ value of the particle size of the crushed WG was 197.6 microns, which was reduced to 19.8 microns after 4 minutes of dry milling. In addition, WG from the wet milled slurry of IBA, separated by a 710 micron sieve, was also used. This fraction was also ground in the Tema dry mill for 4 minutes and was combined with the first fraction.

The ground WG was added to the sludge powder in selected proportions of 100%/0%, 40%/60%, 60%/40% and 0%/100% (SS/WG). The ground powder mixes of SS and WG were mixed with water (up to about 40% by total dry weight of the resulting mixture) in a batch mixer and then fed to a rotary drum pelletizer having a 40 cm diameter and a 1 meter length rotating at about 17 rpm at an angle of 30° to the horizontal. The resulting "green" pellets were generally spherical or slightly angular. They had an average of from about 4 mm to about 9.5 mm in diameter. The pellets less than 4 mm were returned to the drum for pelletizing again. The pellets greater than 9.5 mm were broken down into smaller pellets by hand and also returned to the pelletizer.

The pellets were coated with PFA from coal combustion by sprinkling the PFA powder onto them. The pellets were then dried at about 110° C. and fed to a rotary kiln having a 77 mm internal diameter by 1,500 mm length, in which the heated zone was 900 mm long. The kiln was set to run at temperatures between 920° C. and 1,220° C. for the different SS/WG mixes. The pellets traveled and rotated along the tube of the rotary kiln at a speed of about 2.8 rpm for about 10 minutes to about 12 minutes. In this example, the kiln was an electric fired rotary furnace available from Carbolite Hope Valley, England, Model No. GTF R195. The pyroprocessed pellets were discharged from the kiln and were allowed to cool at room temperature.

It is noted that the temperature versus density curves (such as that shown in FIG. 1) may vary in each kiln. For example, the curves corresponding to particular proportions of SS and WG or other SAMs may have a temperature of maximum densification slightly lower or higher than those using the specific kiln identified above. The curve shifting may be attributed to a number of factors related to the operational efficiency of the particular kiln, such as the stability of the temperature profile, energy losses, etc. It may therefore be necessary to prepare several samples in a particular kiln being used to identify the temperature range over which aggregates will have desired characteristics.

Results

Tables C-D, below, summarize the physical and mechanical properties of aggregates formed in this Example. It is noted that the aggregates showed substantial changes in their properties with increasing concentrations of WG in the SS.

Table C, below, summarizes test results for aggregates comprising different proportions of SS and WG, pyroprocessed at different temperatures (10 centigrade degree increments). The data is an average of 4 values for the 100% sewage sludge and an average of 2 values for all WG containing samples. The data is plotted on the graph of FIG. 9. The relative dry density of pyroprocessed aggregates was calculated using Archimedes' method and the water absorption was determined from the increase in weight of "surface dry" samples after being submerged in water for 24 hours.

As discussed above, increasing the amount of WG in the mixes resulted in a broader temperature interval between the initial softening, maximum densification, and complete or near complete melting of the samples, due to the modification of the chemical composition and mineralogy of the sewage sludge with increasing amounts of WG. It was also observed that maximum densification occurred at higher temperatures with increasing WG, due to the increased concentrations of silica present in the resulting mixture. For example, 100% Sample X SS, has a maximum densification temperature of about 960° C. A mix of Sample X SS and WG in the proportion of 60% SS/40% WG, has a maximum densification temperature of 1,030° C., and a proportion of 40% SS/60% WG has a maximum densification temperature of 1,060° C.

However, it has been found that the incorporation of WG in SS is not as effective in broadening the temperature range over which pellets sinter, as the incorporation of other LCSAMs. For example, while 100% SS sinters to form a lightweight aggregate of about 1.4 g/cm$^3$ to about 1.8 g/cm$^3$ over a temperature range of from about 930° C. to about 940° C. (10 centigrade degrees), a 60% SS/40% WG sinters over a temperature of about 970° C. to about 1,000° C. (30 to about 35 centigrade degrees) to form an aggregate in that density range. This temperature range is similar to that of 40% SS/60% WG pellets for the same aggregate density ranges. It is believed that this is due to the presence of high concentrations of sodium and calcium oxides present in the WG, which act as fluxes. It is also believed that the fluxes and the melting glass produce a low viscosity melt, producing a denser, lower porosity product than with the other low calcium silicoaluminous materials.

TABLE C

PHYSICAL PROPERTIES OF SS/WG AGGREGATES

| Ratio (SS/WG) Sample X | Temperature (° C.) | Density (g/cm$^3$) | Water Absorption (%) |
|---|---|---|---|
| 100/0 | 920 | 1.18 | 44.56 |
|  | 930 | 1.44 | 36.84 |
|  | 940 | 1.82 | 22.34 |
|  | 950 | 2.19 | 3.41 |
|  | 960 | 2.48 | 1.50 |
|  | 970 | 1.96 | 0.42 |
|  | 980 | 1.70 | 0.15 |
| 60/40 | 970 | 1.46 | 28.54 |
|  | 980 | 1.50 | 26.32 |
|  | 990 | 1.62 | 18.42 |
|  | 1000 | 1.71 | 13.21 |
|  | 1010 | 1.92 | 7.44 |
|  | 1020 | 2.28 | 0.94 |
|  | 1030 | 2.55 | 0.26 |
|  | 1040 | 2.11 | 0.10 |
|  | 1050 | 1.99 | 0.04 |
|  | 1060 | 1.89 | 0.02 |
|  | 1070 | 1.82 | 0.01 |
|  | 1080 | 1.71 | 0.01 |
|  | 1090 | 1.58 | 0.01 |
| 40/60 | 1000 | 1.44 | 21.45 |
|  | 1010 | 1.59 | 16.23 |
|  | 1020 | 1.75 | 11.84 |
|  | 1030 | 1.94 | 3.01 |
|  | 1040 | 2.18 | 1.83 |
|  | 1050 | 2.31 | 0.86 |
|  | 1060 | 2.62 | 0.42 |
|  | 1070 | 2.28 | 0.14 |
|  | 1080 | 2.11 | 0.05 |
|  | 1090 | 1.95 | 0.03 |
|  | 1100 | 1.75 | 0.01 |
| 0/100 | 1080 | 1.52 | 18.36 |
|  | 1100 | 1.68 | 13.98 |
|  | 1120 | 1.74 | 9.85 |
|  | 1130 | 1.88 | 2.56 |
|  | 1140 | 1.99 | 1.84 |
|  | 1150 | 2.10 | 0.88 |
|  | 1160 | 2.22 | 0.56 |
|  | 1180 | 2.48 | 0.08 |
|  | 1200 | 2.66 | 0.03 |
|  | 1210 | 2.18 | 0.02 |
|  | 1220 | 2.08 | 0.04 |

As is apparent from FIG. 9 and Table C, temperature may be used to determine the density and other characteristics of the sintered product, for a given combination of SS and WG. For example, in a 40%/60% mix of SS/WG mix, sintering at 1000° C. will yield a LWA with a density of about 1.4 g/cm$^3$, while sintering the same mixture at 1060° C. will yield a normal weight aggregate with a density of about 2.6 g/cm$^3$.

Table C also shows the effect of WG addition on the water absorption of the different aggregates. LWAs, which are produced at lower temperatures than the temperature of maximum densification, typically have some porosity. As maximum densification is approached, the size and number of the pores gradually decrease to zero, as the pores are filled with melted material. Aggregates containing high amounts of SS exhibit a rapid reduction in water absorption capacities with temperature, while high WG aggregates show a more gradual water absorption reduction with temperature. The 100% WG aggregates have substantially less water absorption than all other mixes at all temperatures examined, due to the melted glass filling the pores produced by volatilization.

Table D, below, summarizes Aggregate Crushing Values ("ACVs"), as a percentage, for selected mixes of SS and WG, at specific pyroprocessing temperatures. The ACVs are provided at three different temperatures for the different proportions of WG to SS. ACV is inversely proportional to aggregate strength. The selected temperatures were those causing different product characteristics and different microstructures, for comparison. At the lower temperatures in each set, a sintered LWA was produced in accordance with a preferred embodiment of the invention. At the middle temperatures, a well-sintered or vitrified, normal weight aggregate with small amounts of residual pores was produced, in accordance with an embodiment of the invention. At the higher temperatures, a vitrified LWA was produced, also in accordance with an embodiment of the invention.

TABLE D

AGGREGATE CRUSHING VALUE (%)

| Ratio SS/WG | Temper. (° C.) | ACV (%) | Temper. (° C.) | ACV (%) | Temper. (° C.) | ACV (%) |
|---|---|---|---|---|---|---|
| 100/0 | 930 | 57.3 | 960 | 9.8 | 970 | 13.6 |
| 60/40 | 970 | 36.4 | 1030 | 9.3 | 1060 | 14.5 |
| 40/60 | 1000 | 22.2 | 1060 | 8.9 | 1100 | 13.9 |
| 0/100 | 1120 | 15.7 | 1200 | 5.9 | 1220 | 11.2 |

ACVs were lower and the strengths of the aggregates were higher at the temperature of maximum densification (middle temperature). Below that temperature, the densities were lower, the ACVs were higher, and the strengths of individual or bulk aggregates were lower. Above that temperature (middle), the ACVs started to increase as the density and aggregate strength decreased, due to increasing sample melting. The aggregate strengths show the same trend of aggregate densities with increasing temperature, increasing to a maximum value and then decreasing, as expected. The LWAs comprising 40% SS and 60% WG at the temperatures shown in Table D in accordance with embodiments of the invention, also have lower ACVs and higher strengths than the commercially available lightweight aggregate LYTAG, which has an ACV of about 34%, as noted below.

Based on the effect of pyroprocessing temperature and WG addition on the properties of the pyroprocessed aggregates, shown in FIG. 9, and Tables C and D, a 40% SS/60% WG mix, sintered at a temperature range of 1000° C. to 1100° C., which resulted in aggregates having densities from about 1.4 g/cm$^3$ to about 2.6 g/cm$^3$, is preferred. Such aggregates may be used in a range of applications, including as normal weight and lightweight aggregates in concrete. This combination will sinter to form aggregates over the broadest temperature range of 100 centigrade degrees. The behavior of this mixture during sintering and other pyroprocessing, and the final properties of the resulting aggregates may therefore be more easily controlled than in an aggregate comprising 100% SS. The reduced water absorption of aggregates of this combination is due to the melted glass.

Table E summarizes certain physical properties (relative dry densities and water absorptions from Table C, and bulk densities) and mechanical properties (ACV from Table D) of aggregates from 40% SS/60% WG mix at three selected temperatures. The corresponding properties of the commercial aggregates LYTAG (sintered PFA) and OPTIROC (expanded clay) are also given in Table E. The individual aggregate properties are average values of 20 measurements and the bulk aggregate properties are averages of 2 measurements.

TABLE E

PHYSICAL AND MECHANICAL PROPERTIES OF AGGREGATES

| Ratio SS/WG | Temp. (° C.) | Relative Dry Density (g/cm$^3$) | Water Absorption (%) | Bulk Density (g/cm$^3$) | ACV (%) |
|---|---|---|---|---|---|
| 40/60 | 1000 | 1.44 | 21.45 | 0.72 | 22.2 |
|  | 1060 | 2.62 | 0.42 | 1.78 | 8.9 |
|  | 1100 | 1.75 | 0.01 | 1.03 | 13.9 |
| Lytag |  | 1.48 | 15.5 | 0.85 | 34.2 |
| Optiroc |  | 0.68 | 11.0 | 0.39 | 92.3 |

A comparison of the properties of LYTAG and the aggregates comprising 40%/60% mix of SS/WG sintered at 1000° C., shows that the WG-containing aggregates had comparable individual and bulk aggregate densities, higher water absorption, and significantly lower ACVs than that of LYTAG, showing that they can resist higher stresses as a bulk when loaded in compression. OPTIROC has very low density, relatively low water absorption, and very low strength. This is to be expected since OPTIROC has a honeycombed microstructure having a high volume of isolated spherical porosity.

Example 2

In this example, synthetic aggregates were made comprising high calcium SS Samples X and Y and granite sawing residues ("GSR"), which is a Group B, LCSAM (2.61% calcium oxide (CaO)). The average chemical compositions of the SS samples and the GSR used in these experiments are shown in Table F, below. The same equipment used in Example 1 was used here.

TABLE F

CHEMICAL ANALYSIS OF SS AND GSR

| | Weight (%) | | |
|---|---|---|---|
| Constituent | SS (Sample X) | SS (Sample Y) | GSR |
| $SiO_2$ | 16.02 | 31.24 | 65.17 |
| $Al_2O_3$ | 6.83 | 6.22 | 14.75 |
| $Fe_2O_3$ | 2.35 | 6.33 | 6.28 |
| CaO | 20.28 | 12.12 | 2.61 |
| MgO | 3.00 | 2.25 | 0.32 |
| $Na_2O$ | 0.30 | 0.58 | 2.02 |
| $K_2O$ | 0.59 | 0.32 | 4.22 |

SS Samples X and Y and GSR were subjected to processing described above and shown in FIG. 6. GSR passing through a 250 mesh sieve (63 microns) was added to dried sludge powder before the mix was pelletized and pyroprocessed.

The GSR powder, sieved to less than 63 microns, was added to SS powder in selected proportions of 100%/0%, 80%/20%, 60%/40% and 40%/60% (SS/GSR). Water was added to the mixture (up to 35% by total dry weight of the resulting mixture) in a batch mixer until the consistency of the mix allowed pelletization, as discussed above. The mix was fed to a revolving drum and the pellets collected at the end of the drum were sieved through 4 and 9.5 mm sieves. The pellets were coated with PFA (by sprinkling), and were then dried in an oven at about 110° C., overnight. The resulting green pellets were then sintered in a rotary kiln for about 10 to about 12 minutes. The pellets formed from SS Sample X and GSR dusts were fired at temperatures between 920° C. to 1150° C., while the pellets formed from SS Sample Y and GSR were fired at temperatures between 970° C. to 1140° C.

Results

Tables G-H, below, summarize the physical and mechanical properties of aggregates formed by the process described above.

The relative dry density and water absorption of the aggregates were determined, as described in Example 1. In this Example, compressive strength was calculated by loading individual aggregates to fracture between two parallel plates. Stress analysis has shown that when a sphere is tested in this way on two diametrically opposed points the compressive strength a of the sphere is given by the equation:

$$IACS = \sigma = \frac{2.8P}{\pi * d^2}$$

where "IACS"=Individual Aggregate Crushing Strength, d=sphere diameter (mm), and P=fracture load (N). Mean values of the compressive strength were calculated from tests completed on at least 12 aggregates prepared at each temperature. The load was applied by a compression testing device until the aggregate fractures. A dial gauge on the device gives a reading indicative of the load causing fracture. The load was calculated from the reading by the following equations: Load (lbs)=550.95 (Reading)−1620.7; Load (kg)=Load (lbs)/2.205).

Table G, below, summarizes test results for aggregates comprising different proportions of SS and GSR at different temperatures, for the two Samples X and Y. The data is plotted on the graph of FIG. 1 and FIG. 10 for Samples X and Y respectively. Table G also summarizes IACS results for specific mixes of SS and GSR, at specific sintering temperatures. As discussed above, increasing the LCSAM concentration in the mixes (GSR in this example) resulted in a broader temperature interval between the initial softening, maximum densification, and complete or near complete melting of the samples, due to the modification of the chemical composition and mineralogy of the sewage sludge with the GSR dust.

TABLE G

PHYSICAL AND MECHANICAL PROPERTIES OF SS/GSR AGGREGATES

| Ratio (SS/GSR) Sample X | Temp. (° C.) | Density (g/cm³) | Water Absorption (%) | IACS (MPa) | Ratio (SS/GSR) Sample Y | Temp. (° C.) | Density (g/cm³) | Water Absorption (%) |
|---|---|---|---|---|---|---|---|---|
| 100/0 | 920 | 1.18 | 44.56 | 125 | 100/0 | 990 | 1.42 | 38.23 |
|  | 930 | 1.44 | 36.84 | 289 |  | 1000 | 1.47 | 33.12 |
|  | 940 | 1.82 | 22.34 | 654 |  | 1010 | 1.51 | 31.89 |
|  | 950 | 2.19 | 3.41 | 885 |  | 1020 | 1.58 | 27.66 |
|  | 960 | 2.48 | 1.50 | 1067 |  | 1030 | 1.80 | 18.56 |
|  | 970 | 1.96 | 0.42 | 943 |  | 1040 | 2.11 | 8.57 |
|  | 980 | 1.70 | 0.15 | 678 |  | 1050 | 2.39 | 3.63 |
| 80/20 | 970 | 1.58 | 29.55 | 386 |  | 1060 | 2.29 | 1.11 |
|  | 980 | 1.78 | 21.45 | 612 |  | 1070 | 2.08 | 0.74 |
|  | 990 | 2.05 | 7.89 | 857 |  | 1080 | 1.96 | 0.55 |
|  | 1000 | 2.39 | 0.79 | 1048 |  | 1090 | 1.86 | 0.20 |
|  | 1010 | 2.04 | 0.36 | 1002 |  | 1100 | 1.7 | 0.12 |
|  | 1020 | 1.91 | 0.07 | 978 |  | 1110 | 1.60 | 0.11 |
|  | 1030 | 1.72 | 0.04 | 832 | 80/20 | 970 | 1.41 | 35.63 |
|  | 1040 | 1.58 | 0.03 | 675 |  | 980 | 1.45 | 32.12 |
| 60/40 | 1000 | 1.47 | 34.25 | 322 |  | 990 | 1.50 | 30.07 |
|  | 1010 | 1.49 | 31.52 | 398 |  | 1000 | 1.58 | 26.32 |
|  | 1020 | 1.52 | 27.56 | 417 |  | 1010 | 1.62 | 23.12 |
|  | 1030 | 1.65 | 23.74 | 502 |  | 1020 | 1.68 | 16.96 |
|  | 1040 | 1.88 | 14.12 | 674 |  | 1030 | 1.79 | 11.32 |
|  | 1050 | 2.11 | 8.24 | 866 |  | 1040 | 1.96 | 8.56 |
|  | 1060 | 2.38 | 0.82 | 1077 |  | 1050 | 2.18 | 6.11 |
|  | 1070 | 2.29 | 0.60 | 1012 |  | 1060 | 2.34 | 1.03 |
|  | 1080 | 2.10 | 0.50 | 996 |  | 1070 | 2.48 | 0.46 |
|  | 1090 | 1.95 | 0.12 | 954 |  | 1080 | 2.28 | 0.12 |
|  | 1100 | 1.84 | 0.04 | 898 |  | 1090 | 2.01 | 0.1 |
|  | 1110 | 1.73 | 0.06 | 856 |  | 1100 | 1.84 | 0.04 |
|  | 1120 | 1.62 | 0.03 | 731 | 60/40 | 990 | 1.45 | 28.11 |
| 40/60 | 1000 | 1.45 | 29.53 | 378 |  | 1000 | 1.49 | 27.19 |
|  | 1010 | 1.49 | 28.77 | 412 |  | 1010 | 1.50 | 26.34 |
|  | 1020 | 1.52 | 26.74 | 477 |  | 1020 | 1.54 | 24.13 |
|  | 1030 | 1.56 | 24.62 | 523 |  | 1030 | 1.59 | 21.44 |
|  | 1040 | 1.59 | 21.42 | 589 |  | 1040 | 1.62 | 18.67 |
|  | 1050 | 1.63 | 18.83 | 621 |  | 1050 | 1.68 | 17.03 |
|  | 1060 | 1.68 | 18.24 | 665 |  | 1060 | 1.77 | 14.24 |
|  | 1070 | 1.76 | 13.25 | 736 |  | 1070 | 1.89 | 6.97 |

TABLE G-continued

PHYSICAL AND MECHANICAL PROPERTIES OF SS/GSR AGGREGATES

| Ratio (SS/GSR) Sample X | Temp. (° C.) | Density (g/cm³) | Water Absorption (%) | IACS (MPa) | Ratio (SS/GSR) Sample Y | Temp. (° C.) | Density (g/cm³) | Water Absorption (%) |
|---|---|---|---|---|---|---|---|---|
| | 1080 | 1.86 | 9.35 | 803 | | 1080 | 2.06 | 3.57 |
| | 1090 | 2.05 | 5.64 | 962 | | 1090 | 2.29 | 2.14 |
| | 1100 | 2.29 | 2.83 | 1043 | | 1100 | 2.44 | 0.58 |
| | 1110 | 2.46 | 0.07 | 1079 | | 1110 | 2.31 | 0.13 |
| | 1120 | 2.38 | 0.67 | 1022 | | 1120 | 2.11 | 0.04 |
| | 1130 | 2.21 | 0.42 | 1008 | | 1130 | 2.03 | 0.02 |
| | 1140 | 2.07 | 0.08 | 998 | 40/60 | 1040 | 1.58 | 19.45 |
| | 1150 | 1.92 | 0.13 | 962 | | 1050 | 1.69 | 17.88 |
| | | | | | | 1060 | 1.75 | 14.25 |
| | | | | | | 1070 | 1.80 | 11.68 |
| | | | | | | 1080 | 1.85 | 8.25 |
| | | | | | | 1090 | 1.94 | 6.66 |
| | | | | | | 1100 | 2.00 | 4.01 |
| | | | | | | 1110 | 2.09 | 3.45 |
| | | | | | | 1120 | 2.22 | 1.97 |
| | | | | | | 1130 | 2.38 | 0.46 |
| | | | | | | 1140 | 2.31 | 0.54 |

The water absorptions of aggregates from mixes containing high concentrations of SS, and more particularly Sample X, decrease rapidly with increasing temperatures, while aggregates from mixes with higher amounts of GSR show a more gradual water absorption reduction with temperature. The IACS show similar trends to densities, as expected, increasing to the temperature of maximum densification and decreasing at greater temperatures. The increase in aggregate strength with increasing temperature is rapid for aggregates from 100% SS mixes and becomes more gradual with increasing amounts of GSR.

Based on these results, a preferred SS/GSR mix to produce sintered products that can be used in a range of applications including LWA in concrete, is the 40%/60% SS/GSR mix for both Samples X and Y. Aggregates produced from mixes of SS containing GSR sinter over a wider temperature range than SS alone, so the behavior during sintering and the final properties of aggregates may, therefore, be more easily controlled. The 40%/60% SS/GSR mix is sintered to form a LWA, with a density less than 2.0 g/cm³ over the temperature range of 1000° C. to 1080° C., for example for Sample X. Aggregates with desired properties and characteristics (porosity, density, strength) may therefore be more readily made.

As is apparent from FIGS. 1 and 10 and Table G, controlling the temperature enables production of an aggregate with a predetermined density and other characteristics, for a given combination of SS and GSR, when the characteristics and composition of SS are known. For example, using Sample X, for a 40%/60% mix of SS/GSR, sintered at 1000° C., yielded a LWA with a density of about 1.4 to about 1.5 g/cm³, while sintering at about 1110° C. yielded a normal weight aggregate with a density of about 2.5 g/cm³.

Table H summarizes the physical (relative dry and bulk densities, water absorptions) and mechanical properties (ACV) of sintered aggregates from 40%/60% mixes of Sample Y SS/GSR pellets at four different temperatures, along with the corresponding properties of LYTAG aggregates. Aggregates produced at the temperatures below the temperature of maximum densification had densities less than 2.0 g/cm³, relatively low water absorptions, and high strengths. They were therefore well suited for use in lightweight concrete. LYTAG had a lower relative density and aggregate strength than these aggregates.

TABLE H

PHYSICAL AND MECHANICAL PROPERTIES OF AGGREGATES

| Ratio SS/GSR | Temp. (° C.) | Relative Density (g/cm³) | Water Absorption (%) | Bulk Density (g/cm³) | ACV (%) |
|---|---|---|---|---|---|
| 40/60 | 1040 | 1.58 | 19.45 | 0.73 | 18.2 |
| | 1060 | 1.75 | 14.25 | 0.87 | 16.9 |
| | 1080 | 1.85 | 8.25 | 1.09 | 15.3 |
| | 1130 | 2.38 | 0.46 | 1.66 | 7.2 |
| Lytag | | 1.48 | 15.50 | 0.85 | 34.2 |

Example 3

In this example, pyroprocessed aggregates were made comprising Sample Y SS, moderately high calcium SS (calcium oxide (CaO) of 12.12%), and slate, which is a LCSAM (calcium oxide (CaO) 1.82%). The average chemical analyses of Sample Y SS, and slate, which were used in these experiments, are shown in Table I, below. Sewage sludge Sample Y was used in these experiments. The same equipment used in Example 1 is used here.

TABLE I

CHEMICAL ANALYSIS OF SS AND SLATE (wt %)

| Constituent | Slate | Sewage Sludge Sample Y |
|---|---|---|
| $SiO_2$ | 58.32 | 31.24 |
| $Al_2O_3$ | 28.54 | 6.22 |
| $Fe_2O_3$ | 7.23 | 6.33 |
| CaO | 1.82 | 12.12 |
| MgO | 3.67 | 2.25 |
| $Na_2O$ | 1.45 | 0.58 |
| $K_2O$ | 0.88 | 0.32 |
| $TiO_2$ | 0.02 | 0.41 |

The slate was subjected to processing as described in FIG. 6 and in more detail in the previous Examples.

Sewage sludge was dried at 110° C. for 24 hours before the solid cake being ground to fine powder. Slate was added to the sewage sludge powder in selected proportions of 100%/0%, 80%/20%, 60%/40% and 40%/60% (SS/slate). Water was added to the mixture (up to 45% by total dry weight of the resulting mixture) in a batch mixer to form a clay-like mixture for pelletization. Since slate has a fine particle size distribution, it was directly mixed with the SS powder. Slate may need to be ground to a fine size before further processing with the SS. The resulting green pellets were in the range of 4 mm to 9.5 mm. The pellets containing slate, were coated with slate powder, dried at 110° C., and fed to the rotary kiln described above. The resulting pellets were fired at temperatures between 990 to 1210° C. for about 10 to 12 minutes before being discharged from the kiln and allowed to cool at room temperature.

Results

Tables J to K, below, summarize the physical and mechanical properties of pyroprocessed aggregates from selected SS/slate mixes and pyroprocessing temperatures. The relative dry density and water absorption of the pyroprocessed aggregates was determined as described in Example 1.

Table J summarizes physical properties results (relative dry densities, water absorptions) and mechanical properties ASMI (Aggregate Strength Mass Index). The data is plotted on the graph of FIG. 11. As discussed above, increasing the slate concentration in the mixes resulted in a broader temperature interval between the initial softening, maximum densification, and melting of the samples, due to the modification of the chemical composition and mineralogy of the SS with slate. The compressive strength of individual aggregates was also defined as an Aggregate Strength Mass Index ("ASMI") as follows:

$$ASMI = \frac{P}{m},$$

where P=fracture load (kg) and m=mass of pellet (kg). Mean values of the compressive strength were calculated from tests completed on at least 12 aggregates prepared at each pyroprocessing temperature and under different proportions.

TABLE J

PHYSICAL AND MECHANICAL PROPERTIES OF SS/ SLATE AGGREGATES

| Ratio (SS/SLATE) | Temperature (° C.) | Density (g/cm³) | Water Absorption (%) | ASMI |
|---|---|---|---|---|
| 100/0 | 990 | 1.42 | 38.23 | 1.4 |
| | 1000 | 1.47 | 33.12 | 4.2 |
| | 1010 | 1.51 | 31.89 | 4.8 |
| | 1020 | 1.58 | 27.66 | 5.1 |
| | 1030 | 1.80 | 18.56 | 7.7 |
| | 1040 | 2.11 | 8.57 | 12.1 |
| | 1050 | 2.39 | 3.63 | 16.4 |
| | 1060 | 2.29 | 1.11 | 12.6 |
| | 1070 | 2.08 | 0.74 | 12.3 |
| | 1080 | 1.96 | 0.55 | 11.4 |
| | 1090 | 1.86 | 0.20 | 10.3 |
| | 1100 | 1.71 | 0.12 | 8.8 |
| | 1110 | 1.60 | 0.11 | 7.5 |
| 80/20 | 970 | 1.45 | 33.9 | 4.9 |
| | 980 | 1.52 | 29.34 | 5.3 |
| | 990 | 1.61 | 27.45 | 6.4 |
| | 1000 | 1.67 | 22.34 | 6.9 |
| | 1010 | 1.74 | 18.46 | 7.3 |
| | 1020 | 1.85 | 12.12 | 8.7 |
| | 1030 | 1.98 | 8.88 | 10.2 |
| | 1040 | 2.06 | 7.23 | 11.9 |
| | 1050 | 2.11 | 3.04 | 13.6 |
| | 1060 | 2.26 | 1.44 | 15.0 |
| | 1070 | 2.33 | 0.89 | 16.3 |
| | 1080 | 2.13 | 0.23 | 14.1 |
| | 1090 | 2.03 | 0.07 | 12.8 |
| 60/40 | 1010 | 1.54 | 28.10 | 5.1 |
| | 1020 | 1.63 | 26.36 | 6.2 |
| | 1030 | 1.69 | 22.32 | 7.3 |
| | 1040 | 1.75 | 18.56 | 7.9 |
| | 1060 | 1.82 | 16.34 | 8.4 |
| | 1070 | 1.89 | 11.29 | 10.4 |
| | 1080 | 1.99 | 7.67 | 11.6 |
| | 1090 | 2.07 | 4.24 | 12.0 |
| | 1100 | 2.18 | 2.13 | 13.2 |
| | 1110 | 2.29 | 1.04 | 15.9 |
| | 1120 | 2.08 | 0.77 | 15.3 |
| | 1130 | 2.02 | 0.32 | 14.9 |
| | 1140 | 1.89 | 0.03 | 12.8 |
| 40/60 | 1080 | 1.59 | 26.3 | 7.1 |
| | 1090 | 1.66 | 22.34 | 8.5 |
| | 1100 | 1.76 | 19.32 | 10.5 |
| | 1110 | 1.82 | 16.35 | 11.2 |
| | 1120 | 1.88 | 11.87 | 11.9 |
| | 1130 | 1.95 | 8.45 | 12.7 |
| | 1140 | 2.03 | 5.34 | 13.3 |
| | 1150 | 2.11 | 3.23 | 13.9 |
| | 1160 | 2.21 | 1.08 | 15.1 |
| | 1170 | 2.34 | 0.65 | 16.9 |
| | 1180 | 2.27 | 0.34 | 16.0 |
| | 1190 | 2.16 | 0.12 | 15.5 |
| | 1200 | 2.02 | 0.06 | 14.1 |
| | 1210 | 1.85 | 0.05 | 13.4 |

The water absorptions of pellets from mixes with high concentrations of SS decrease more rapidly with increasing temperatures, while pellets from mixes with high amounts of slate show a more gradual water absorption decrease with temperature. The ASMI shows similar trends to densities, as expected, increasing to the temperature of maximum densification and decreasing at temperatures above that. The increase in aggregate strength with increasing temperature is more rapid for pellets from 100% SS mixes and becomes more gradual with increasing the amount of slate in the mixes.

Based on the effect of temperature and slate addition on the properties of the sintered aggregates, a 40%/60% Sample Y SS/slate mix, is preferred. The 40%/60% Sample Y SS/Slate mixes were pyroprocessed at temperatures of from 1080° C. to 1210° C., in 10 degree increments. Densities varied from about 1-6 g/cm³ at 970° C. to a maximum density of about 2.3 g/cm³ at 1170° C., to a density of 1.85 g/cm³ at 1210° C. The behaviour of this mixture during sintering and the final properties of the resulting sintered LWAs may be more easily controlled than 100% SS and other combinations of SS and slate, making it easier to manufacture. Aggregates having lower densities and higher water absorptions may also be manufactured by processing the SS/slate pellets at lower temperatures than those used in these experiments.

Aggregates may be produced with predetermined density and other characteristics, for a given combination of SS and slate, by controlling the temperature, as shown by FIG. 11. Lightweight aggregates having comparable or superior properties to LYTAG may be produced from this combination, according to the required aggregate properties.

Table K summarizes the behaviour of the pyroprocessed aggregates resulting from the mixes of SS and slate. The temperature ranges over which the aggregates are pyroprocessed, the corresponding density, water absorption, and ASMI ranges, as well as the temperatures of maximum densification for the different type and proportions of SAM to sewage sludge, are shown.

TABLE K

CHARACTERISTICS OF AGGREGATES OF SS/SLATE

| Ratio SS/SAM | Temper. Range (° C.) | Density Range (g/cm³) | Water Absorption Range (%) | ASMI Range | Temper Maximum Density (° C.) |
|---|---|---|---|---|---|
| 80/20 | 970-1090 | 1.45-2.03 | 0.07-33.9 | 4.9-16.3 | 1070 |
| 60/40 | 1010-1140 | 1.54-1.89 | 0.03-28.1 | 5.1-15.9 | 1110 |
| 40/60 | 1080-1210 | 1.59-1.85 | 0.05-26.3 | 7.1-16.9 | 1170 |

Example 4

In this example, synthetic aggregates were made comprising Sample Z, low calcium SS (calcium oxide (CaO) of 3.20%) and cement kiln dusts ("CKD"), a Group A HCSAM (calcium oxide (CaO) of 63.6%). The average chemical composition of CKD used in these experiments is shown in Table L, below.

TABLE L

CHEMICAL ANALYSIS OF CEMENT KILN DUSTS

| Constituent | Weight (%) CKD |
|---|---|
| $SiO_2$ | 14.9 |
| $Al_2O_3$ | 3.4 |
| $Fe_2O_3$ | 2.9 |
| CaO | 63.6 |
| MgO | 2.3 |
| $Na_2O$ | 0.4 |
| $K_2O$ | 3.2 |
| $P_2O_5$ | 0.09 |
| $SO_3$ | 1.8 |
| $TiO_2$ | 1.1 |

Sample Z SS and CKD were subjected to processing as described above and shown in FIG. 6. The SS was dried at 110° C. for 24 hours and then ground to fine powder. CKD having a fine particle size distribution (95% ($d_{95}$) of the volume of the particles finer than 45 microns) was added to the dried SS powder before the mix was pelletized and pyroprocessed.

The CKD was added to the SS powder in selected proportions of 100%/0%, 95/5%, and 90%/10% (SS/CKD). The powders were mixed with water (up to 35% by dry weight of the resulting mixture) in a batch mixer until the consistency of the mix allowed pelletization. The mix was fed to a revolving drum and the pellets were collected at the end of the drum and sieved through 4 and 9.5 mm sieves. The pellets were coated with CKD and then dried in an oven at about 110° C., overnight. The resulting green pellets were then pyroprocessed in a rotary kiln for about 10 to about 12 minutes at temperatures between 940° C. to 1110° C. Aggregate Strength Mass Index ("ASMI") values were determined as described in Example 3.

Results

Tables M to N, below, summarize the physical and mechanical properties of the aggregates formed by the process described above. The relative dry density, water absorption and ASMI of the aggregates were determined, as described in the Examples above.

Table M, below, summarizes test results for aggregates comprising different proportions of SS and CKD sintered at different temperatures. The data is plotted on the graph of FIG. 2. Table N summarizes physical properties results (relative dry densities, and water absorptions from Table M) and mechanical properties (ASMI from Table M). Increasing the CKD concentration in the mixes resulted in a slightly narrower pyroprocessing temperature range due to modifying the composition of the initial mixture. Since CKD has such a high calcium content, only a small amount was required to increase the mobility of the melts and accelerate the densification of the pellets of the mixture.

TABLE M

PROPERTIES OF SS/CKD AGGREGATES

| Ratio (SS/CKD) | Temperature (° C) | Density (g/cm³) | Water Absorption (%) | ASMI |
|---|---|---|---|---|
| 100/0 | 980 | 1.92 | 14.26 | 9.8 |
| | 990 | 1.96 | 12.63 | 10.2 |
| | 1000 | 1.99 | 10.64 | 10.5 |
| | 1010 | 2.08 | 9.32 | 11.1 |
| | 1020 | 2.13 | 7.45 | 12.6 |
| | 1030 | 2.22 | 3.12 | 13.8 |
| | 1040 | 2.32 | 1.32 | 14.5 |
| | 1050 | 2.39 | 0.85 | 16.3 |
| | 1060 | 2.42 | 0.54 | 16.9 |
| | 1070 | 2.31 | 0.32 | 16.0 |
| | 1080 | 2.26 | 0.12 | 15.2 |
| | 1090 | 2.19 | 0.07 | 14.7 |
| | 1100 | 2.11 | 0.08 | 14.1 |
| | 1110 | 2.02 | 0.05 | 13.5 |
| 95/5 | 980 | 1.68 | 21.45 | 7.6 |
| | 990 | 1.72 | 19.21 | 8.2 |
| | 1000 | 1.78 | 17.53 | 9.4 |
| | 1010 | 1.83 | 15.42 | 9.6 |
| | 1020 | 1.92 | 11.85 | 10.1 |
| | 1030 | 2.01 | 9.02 | 11.4 |
| | 1040 | 2.18 | 6.43 | 12.7 |
| | 1050 | 2.36 | 1.11 | 14.1 |
| | 1060 | 2.41 | 0.64 | 16.3 |
| | 1070 | 2.29 | 0.43 | 14.8 |
| | 1080 | 2.18 | 0.22 | 13.3 |
| | 1090 | 2.06 | 0.11 | 12.3 |
| | 1100 | 1.99 | 0.08 | 11.2 |
| | 1110 | 1.87 | 0.07 | 10.7 |
| 90/10 | 940 | 1.45 | 27.34 | 4.2 |
| | 960 | 1.50 | 25.99 | 4.9 |
| | 970 | 1.53 | 23.67 | 6.2 |
| | 980 | 1.58 | 20.11 | 6.6 |
| | 990 | 1.66 | 18.32 | 7.1 |
| | 1000 | 1.71 | 14.52 | 8.9 |
| | 1010 | 1.77 | 11.44 | 9.6 |
| | 1020 | 1.84 | 8.54 | 10.4 |
| | 1030 | 1.95 | 5.83 | 12.3 |
| | 1040 | 2.06 | 4.12 | 13.2 |
| | 1050 | 2.19 | 2.03 | 14.4 |
| | 1060 | 2.39 | 0.96 | 15.7 |
| | 1070 | 2.20 | 0.54 | 14.4 |
| | 1080 | 2.03 | 0.21 | 12.4 |
| | 1090 | 1.92 | 0.11 | 11.6 |

The water absorption of the aggregates from mixes of high concentrations of SS are lower due to the higher densities attained as a result of the lower amount of fluxing agents in the mixes. The ASMI show similar trends to densities, as expected, increasing to the temperature of maximum densification, and decreasing at temperatures above that. The addition of CKD in SS samples that have lower calcium oxide concentrations than the Sample Z used in these Examples is expected to be more significant than shown in this Example, and higher concentrations of CKD may need to be added to SS to achieve the desired aggregate composition.

Based on the effect of temperature and CKD addition on the properties of the sintered aggregates, a 90%/10% Sample Z SS/CKD mix, sintered at a temperature in a range of 940° C. to 1090° C., which produced pellets with densities from about 1.4 g/cm$^3$ to about 2.0 g/cm$^3$ is preferred. Such aggregates may be used in a range of applications including as lightweight aggregates in concrete. However, for the Sample Z SS used in this Example, even the 95%/5% SS/CKD mix may also be selected for aggregate production, since the original SS already includes some amount of fluxes, such as calcium oxides in the composition. Aggregates having lower densities and higher water absorptions may be manufactured when the aggregates from the SS/CKD mix are fired at lower temperatures than those used in this Example. The presence of fluxes in the material is believed to provide a more improved particle packing and densification, producing aggregates with superior properties to pyroprocessed aggregates from material which do not contain fluxes.

Table N summarizes certain physical and mechanical properties of aggregates from 90%/10% mix of SS/CKD pellets sintered at three selected temperatures.

TABLE N

PHYSICAL AND MECHANICAL PROPERTIES OF AGGREGATES

| Ratio SS/CKD | Temp. (° C.) | Relative Dry Density (g/cm$^3$) | Water Absorption (%) | Bulk Density (g/cm$^3$) | ASMI |
|---|---|---|---|---|---|
| 90/10 | 960 | 1.50 | 25.99 | 0.81 | 4.9 |
|  | 990 | 1.66 | 18.32 | 0.86 | 7.1 |
|  | 1060 | 2.39 | 0.96 | 1.61 | 15.7 |

As above, controlling the pyroprocessing temperature enabled production of an aggregate with a predetermined density and other characteristics, for a given combination of SS and CKD.

Example 5

In this example, synthetic aggregates were made comprising sewage sludge (sample Z) and limestone. The average chemical composition of the limestone used in these experiments is shown in Table O, below.

SS (Sample Z) and limestone powder were subjected to processing described above and shown in FIG. 6. SS was dried at 110° C. for 24 hours before the solid cake being ground to fine powder. Limestone was added to dried sludge powder before the mix being pelletized and pyroprocessed.

TABLE O

CHEMICAL ANALYSIS OF LIMESTONE

| Constituent | Weight (%) |
|---|---|
| $SiO_2$ | 2.8 |
| $Al_2O_3$ | 0.6 |
| $Fe_2O_3$ | 0.4 |
| CaO | 53.2 |
| MgO | 0.0 |
| $K_2O$ | 0.12 |
| $TiO_2$ | 0.0 |

The limestone was added to SS powder in selected proportions of 100%/0%, 95/5%, and 90%/10% and 80%/20% (SS/limestone). The powders were mixed with water (up to 32% by total dry weight of the resulting mixture) in a batch mixer until the consistency of the mix allowed pelletization. The mix was fed to a revolving drum and the pellets collected at the end of the drum were sieved through 4 and 9.5 mm sieves. The pellets were coated with limestone, and were then dried in an oven at about 110° C., overnight. The resulting green pellets were then pyroprocessed in a rotary kiln for about 10 to about 12 minutes at temperatures between 940° C. to 1110° C.

Results

Tables P to Q, below, summarize the physical and mechanical properties of aggregates formed by the process described above. The relative dry density, water absorption and ASMI of aggregates were determined as described in the previous examples.

Table P, below, summarizes test results for sintered aggregates comprising different proportions of SS and limestone sintered at different temperatures. The data is plotted on the graph of FIG. 12. Table Q summarizes physical and mechanical properties of selected aggregates. Increasing the limestone concentration in the mixes resulted in a slightly narrower temperature range over which the aggregates are pyroprocessed.

TABLE P

PROPERTIES OF SS/LIMESTONE AGGREGATES

| Ratio (SS/Limestone) | Temperature (° C.) | Density (g/cm$^3$) | Water Absorption (%) | ASMI |
|---|---|---|---|---|
| 100/0 | 980 | 1.92 | 14.26 | 9.8 |
|  | 990 | 1.96 | 12.63 | 10.2 |
|  | 1000 | 1.99 | 10.64 | 10.5 |
|  | 1010 | 2.08 | 9.32 | 11.1 |
|  | 1020 | 2.13 | 7.45 | 12.6 |
|  | 1030 | 2.22 | 3.12 | 13.8 |
|  | 1040 | 2.32 | 1.32 | 14.5 |
|  | 1050 | 2.39 | 0.85 | 16.3 |
|  | 1060 | 2.42 | 0.54 | 16.9 |
|  | 1070 | 2.31 | 0.32 | 16.0 |
|  | 1080 | 2.26 | 0.12 | 15.2 |
|  | 1090 | 2.19 | 0.07 | 14.7 |
|  | 1100 | 2.11 | 0.08 | 14.1 |
|  | 1110 | 2.02 | 0.05 | 13.5 |
| 95/5 | 980 | 1.75 | 19.45 | 8.4 |
|  | 990 | 1.80 | 16.99 | 9.5 |
|  | 1000 | 1.86 | 14.85 | 9.8 |
|  | 1010 | 1.92 | 10.75 | 10.3 |
|  | 1020 | 1.97 | 8.78 | 10.7 |
|  | 1030 | 2.05 | 6.34 | 12.0 |
|  | 1040 | 2.21 | 5.32 | 13.3 |
|  | 1050 | 2.34 | 1.63 | 14.4 |
|  | 1060 | 2.43 | 0.83 | 16.6 |
|  | 1070 | 2.31 | 0.65 | 15.2 |
|  | 1080 | 2.19 | 0.40 | 14.4 |
|  | 1090 | 2.03 | 0.12 | 13.2 |
|  | 1100 | 1.96 | 0.07 | 12.7 |
|  | 1110 | 1.90 | 0.09 | 11.4 |
| 90/10 | 940 | 1.59 | 24.60 | 5.2 |
|  | 960 | 1.64 | 21.42 | 5.9 |
|  | 970 | 1.69 | 17.34 | 6.5 |
|  | 980 | 1.73 | 16.12 | 7.2 |
|  | 990 | 1.81 | 14.23 | 8.5 |
|  | 1000 | 1.88 | 10.11 | 9.3 |
|  | 1010 | 1.95 | 8.44 | 10.2 |
|  | 1020 | 2.02 | 7.23 | 10.9 |
|  | 1030 | 2.11 | 6.42 | 11.7 |
|  | 1040 | 2.26 | 3.42 | 12.6 |
|  | 1050 | 2.33 | 1.85 | 14.7 |
|  | 1060 | 2.39 | 0.75 | 16.2 |

TABLE P-continued

PROPERTIES OF SS/LIMESTONE AGGREGATES

| Ratio (SS/Limestone) | Temperature (° C.) | Density (g/cm³) | Water Absorption (%) | ASMI |
|---|---|---|---|---|
| | 1070 | 2.21 | 0.54 | 15.2 |
| | 1080 | 2.08 | 0.12 | 14.5 |
| | 1090 | 1.96 | 0.07 | 13.1 |
| 80/20 | 970 | 1.41 | 29.45 | 4.0 |
| | 980 | 1.52 | 25.84 | 5.3 |
| | 990 | 1.61 | 24.23 | 5.7 |
| | 1000 | 1.69 | 20.45 | 7.5 |
| | 1010 | 1.74 | 18.34 | 9.3 |
| | 1020 | 1.85 | 13.24 | 10.1 |
| | 1030 | 1.94 | 7.35 | 11.3 |
| | 1050 | 2.19 | 3.25 | 13.5 |
| | 1060 | 2.41 | 0.97 | 16.2 |
| | 1070 | 2.26 | 0.74 | 15.1 |
| | 1080 | 2.09 | 0.34 | 14.3 |
| | 1090 | 1.98 | 0.13 | 12.2 |
| | 1100 | 1.85 | 0.11 | 11.8 |

The water absorption of aggregates from mixes with high concentrations of sewage sludge are lower due to the higher densities attained as a result of the lower amount of fluxing agents in the mixes. The ASMI shows similar trends to densities, as expected.

The addition of limestone to SS samples having lower calcium oxide concentrations than the Sample Z used in this Example is expected to have a more significant effect than in this invention. Based on the effect of temperature and limestone addition on the properties of the sintered aggregates, is preferred, for use as normal weight or lightweight aggregates. The 90%/10% SS/limestone mixes were pyroprocessed at temperatures of from 940° C. to 1090° C., in 10 degree increments. Densities varied from about 1.6 g/cm³ to a maximum density of about 2.4 g/cm³ at 1060° C., to a density of 2.0 g/cm³ at 1090° C. However, for the SS sample used in this Example, even the 95%/5% SS/limestone mix could be preferred for aggregate production, since the original SS has already some amount of fluxes calcium oxides in the composition.

Table Q summarizes certain physical and mechanical properties of aggregates from 90%/10% mix of SS/limestone pellets sintered at three selected temperatures.

TABLE Q

PHYSICAL AND MECHANICAL PROPERTIES OF AGGREGATES

| Ratio SS/Limestone | Temp. (° C.) | Relative Dry Density (g/cm³) | Water Absorption (%) | Bulk Density (g/cm³) | ASMI |
|---|---|---|---|---|---|
| | 940 | 1.59 | 24.60 | 0.84 | 5.2 |
| 90/10 | 970 | 1.69 | 17.34 | 0.88 | 6.5 |
| | 1060 | 2.39 | 0.75 | 1.64 | 16.2 |

Example 6

In this example, synthetic aggregates were made comprising (Sample Z) and MSW incinerator fly ash ("IFA"). The average chemical composition of the incinerator fly ash used in these experiments is shown in Table R, below.

TABLE R

CHEMICAL ANALYSIS OF MSW IFA

| Constituent | Weight (%) |
|---|---|
| $SiO_2$ | 18.98 |
| $Al_2O_3$ | 9.43 |
| $Fe_2O_3$ | 2.35 |
| CaO | 36.02 |
| MgO | 4.12 |
| $P_2O_5$ | 1.39 |
| $SO_3$ | 2.45 |
| $K_2O$ | 1.68 |
| $Na_2O$ | 4.69 |
| $TiO_2$ | 1.82 |

SS (Sample Z) and IFA were subjected to processing described above and shown in FIG. 6. SS was dried at 110° C. for 24 hours before the solid cake being ground to fine powder. IFA was added to dried SS powder before the mix being pelletized and pyroprocessed.

The IFA was added to SS powder in selected proportions of 100%/0%, 95%/5%, and 90%/10% and 80%/20% (SS/IFA). The powders were mixed with water (up to 37% by total dry weight of the resulting mixture) in a batch mixer until the consistency of the mix allowed pelletization. The mix was fed to a revolving drum and the pellets were collected at the end of the drum were sieved through 4 and 9.5 mm sieves. The pellets were coated with fly ash, and were then dried in an oven at about 110° C., overnight. The resulting pellets were then pyroprocessed in a rotary kiln for about 10 to about 12 minutes at temperatures between 980° C. to 1110° C.

Results

Tables S to T, below, summarize the physical properties of aggregates formed by the process described above. The data is plotted on the graph of FIG. 13. Increasing the IFA concentration in the mixes resulted in a slightly narrower temperature interval between the initial softening, maximum densification, and melting of the samples, due to the modification of the chemical composition and mineralogy of the SS.

TABLE 5

PROPERTIES OF SS/IFA AGGREGATES

| Ratio (SS/WA) | Temperature (°C.) | Density (g/cm³) | Water Absorption (%) |
|---|---|---|---|
| 100/0 | 980 | 1.92 | 14.26 |
| | 990 | 1.96 | 12.63 |
| | 1000 | 1.99 | 10.64 |
| | 1010 | 2.08 | 9.32 |
| | 1020 | 2.13 | 7.45 |
| | 1030 | 2.22 | 3.12 |
| | 1040 | 2.32 | 1.32 |
| | 1050 | 2.39 | 0.85 |
| | 1060 | 2.42 | 0.54 |
| | 1070 | 2.31 | 0.32 |
| | 1080 | 2.26 | 0.12 |
| | 1090 | 2.19 | 0.07 |
| | 1100 | 2.11 | 0.08 |
| | 1110 | 2.02 | 0.05 |
| 95/5 | 980 | 1.82 | 15.54 |
| | 990 | 1.85 | 13.97 |
| | 1000 | 1.90 | 11.74 |
| | 1010 | 1.95 | 9.11 |
| | 1020 | 2.08 | 7.35 |
| | 1030 | 2.14 | 5.33 |
| | 1040 | 2.29 | 2.11 |
| | 1050 | 2.35 | 0.89 |
| | 1060 | 2.41 | 0.56 |
| | 1070 | 2.29 | 0.33 |

TABLE 5-continued

PROPERTIES OF SS/IFA AGGREGATES

| Ratio (SS/WA) | Temperature (°C.) | Density (g/cm³) | Water Absorption (%) |
|---|---|---|---|
| | 1080 | 2.18 | 0.12 |
| | 1090 | 2.11 | 0.1 |
| | 1100 | 2.01 | 0.08 |
| | 1110 | 1.97 | 0.06 |
| 90/10 | 970 | 1.60 | 20.35 |
| | 980 | 1.69 | 17.33 |
| | 990 | 1.76 | 15.63 |
| | 1000 | 1.82 | 11.21 |
| | 1010 | 1.88 | 8.34 |
| | 1020 | 1.99 | 5.53 |
| | 1030 | 2.05 | 4.23 |
| | 1040 | 2.14 | 2.66 |
| | 1050 | 2.30 | 1.43 |
| | 1060 | 2.43 | 0.66 |
| | 1070 | 2.30 | 0.43 |
| | 1080 | 2.21 | 0.23 |
| | 1090 | 2.09 | 0.15 |
| | 1100 | 1.96 | 0.08 |
| | 1110 | 1.89 | 0.05 |
| 80/20 | 980 | 1.54 | 26.34 |
| | 990 | 1.58 | 23.5 |
| | 1000 | 1.63 | 21.53 |
| | 1010 | 1.75 | 17.34 |
| | 1020 | 1.86 | 13.24 |
| | 1030 | 1.92 | 8.45 |
| | 1040 | 2.01 | 5.35 |
| | 1050 | 2.19 | 3.22 |
| | 1060 | 2.38 | 0.75 |
| | 1070 | 2.23 | 0.53 |
| | 1080 | 2.08 | 0.23 |
| | 1090 | 1.94 | 0.12 |
| | 1100 | 1.85 | 0.06 |
| | 1110 | 1.76 | 0.04 |

Based on the effect of temperature and IFA addition on the properties of the aggregates, a 80%/20% SS/IFA mix is preferred to produce aggregate having densities between 1.5 g/cm³ to 2.4 g/cm³. However, the 90%/10% SS/IFA mix, over the same pyroprocessing temperature range is also preferred.

Table T summarizes certain physical properties of aggregates from 80%/20% mix of SS/IFA at three selected temperatures.

TABLE T

PHYSICAL PROPERTIES OF AGGREGATES

| Ratio SS/IFA | Temp. (°C.) | Relative Dry Density (g/cm³) | Water Absorption (%) | Bulk density (g/cm³) |
|---|---|---|---|---|
| 80/20 | 980 | 1.54 | 26.34 | 0.80 |
| | 1000 | 1.63 | 21.53 | 0.83 |
| | 1060 | 2.38 | 0.75 | 1.56 |

Example 7

In this example, synthetic aggregates were made comprising SS (Sample Z) and ground granulated blast furnace slag ("GGBS"). The average chemical composition of GGBS used in these experiments is shown in Table U, below.

TABLE U

CHEMICAL ANALYSIS OF GGBS

| Constituent | Weight (%) |
|---|---|
| $SiO_2$ | 32.6 |
| $Al_2O_3$ | 12.8 |
| $Fe_2O_3$ | 1.1 |
| CaO | 41.3 |
| MgO | 5.3 |
| $SO_3$ | 1.9 |
| $K_2O$ | 0.7 |
| $Na_2O$ | 0.44 |
| $TiO_2$ | 0.6 |

SS (Samples Z) and GBS were subjected to processing described above and shown in FIG. 6. SS was dried at 110° C. before the solid cake being ground to fine powder. GBFS was added to dried sludge powder before the mix being pelletized and pyroprocessed.

The GGBS was added to sludge powder in selected proportions of 100%/0%, 95/5%, and 90%/10% and 80%/20% (SS/GGBS). The powders were mixed with water (up to 35% by total dry weight of the resulting mixture) in a batch mixer until the consistency of the mix allowed pelletization. The mix was pelletized and the pellets were sieved through 4 and 9.5 mm sieves. The pellets were coated with GGBS, and were then dried in an oven at about 110° C., overnight. The resulting pellets were pyroprocessed in a rotary kiln for about 10 to about 12 minutes at temperatures between 970° C. to 1110° C.

Results

Tables V to W, below, summarize the physical properties of aggregates formed by the process described above. Table V, below, summarizes test results for aggregates comprising different proportions of SS and GGBS fired at different temperatures. The data is plotted on the graph of FIG. 14. A similar effect as CKD, IFA, and limestone was observed for increasing GGBS concentration in sewage sludge mixes.

TABLE V

PROPERTIES OF SS/GGBS AGGREGATES

| Ratio (SS/GGBS) | Temperature (° C.) | Density (g/cm³) | Water Absorption (%) |
|---|---|---|---|
| 100/0 | 980 | 1.92 | 14.26 |
| | 990 | 1.96 | 12.63 |
| | 1000 | 1.99 | 10.64 |
| | 1010 | 2.08 | 9.32 |
| | 1020 | 2.13 | 7.45 |
| | 1030 | 2.22 | 3.12 |
| | 1040 | 2.32 | 1.32 |
| | 1050 | 2.39 | 0.85 |
| | 1060 | 2.42 | 0.54 |
| | 1070 | 2.31 | 0.32 |
| | 1080 | 2.26 | 0.12 |
| | 1090 | 2.19 | 0.07 |
| | 1100 | 2.11 | 0.08 |
| | 1110 | 2.02 | 0.05 |
| 95/5 | 980 | 1.75 | 17.43 |
| | 990 | 1.82 | 14.80 |
| | 1000 | 1.87 | 13.22 |
| | 1010 | 1.91 | 10.85 |
| | 1020 | 1.99 | 8.33 |
| | 1030 | 2.11 | 5.73 |
| | 1040 | 2.29 | 2.60 |
| | 1050 | 2.38 | 1.04 |
| | 1060 | 2.44 | 0.78 |
| | 1070 | 2.26 | 0.55 |
| | 1080 | 2.17 | 0.32 |

TABLE V-continued

PROPERTIES OF SS/GGBS AGGREGATES

| Ratio (SS/GGBS) | Temperature (° C.) | Density (g/cm³) | Water Absorption (%) |
|---|---|---|---|
|  | 1090 | 2.07 | 0.12 |
|  | 1100 | 1.99 | 0.07 |
|  | 1110 | 1.94 | 0.03 |
| 90/10 | 970 | 1.58 | 23.35 |
|  | 980 | 1.67 | 19.24 |
|  | 990 | 1.74 | 17.34 |
|  | 1000 | 1.82 | 13.24 |
|  | 1010 | 1.89 | 9.34 |
|  | 1020 | 1.97 | 6.21 |
|  | 1030 | 2.07 | 4.15 |
|  | 1040 | 2.18 | 2.43 |
|  | 1050 | 2.31 | 1.05 |
|  | 1060 | 2.42 | 0.45 |
|  | 1070 | 2.31 | 0.13 |
|  | 1080 | 2.22 | 0.09 |
|  | 1090 | 2.10 | 0.04 |
|  | 1100 | 1.97 | 0.02 |
|  | 1110 | 1.91 | 0.02 |
| 80/20 | 980 | 1.50 | 28.22 |
|  | 990 | 1.59 | 23.42 |
|  | 1000 | 1.64 | 20.40 |
|  | 1010 | 1.72 | 17.85 |
|  | 1020 | 1.85 | 12.97 |
|  | 1030 | 1.93 | 8.34 |
|  | 1040 | 2.03 | 4.89 |
|  | 1050 | 2.20 | 3.11 |
|  | 1060 | 2.39 | 0.67 |
|  | 1070 | 2.25 | 0.23 |
|  | 1080 | 2.09 | 0.09 |
|  | 1090 | 1.92 | 0.07 |
|  | 1100 | 1.86 | 0.03 |
|  | 1110 | 1.78 | 0.02 |

Based on the effect of temperature and GGBS addition on the properties of the produced aggregates, a 80%/20% SS/GGBS mix, sintered between 980° C. to 1110° C. to produce aggregate having densities from about 1.5 g/cm³ to about 2.4 g/cm³, is preferred. However, for the SS Sample Z used in this Example, even the 90%/10% SS/GGBS mix may also be effective for aggregate production, since the original SS has already some amount of fluxing components, such as calcium oxides, in the composition.

Table W summarizes certain physical properties of aggregates from 80%/20% SS/GGBS pellets.

TABLE W

PHYSICAL PROPERTIES OF AGGREGATES

| Ratio SS/GGBS | Temp. (° C.) | Relative Dry Density (g/cm³) | Water Absorption (%) | Bulk Density (g/cm³) |
|---|---|---|---|---|
|  | 980 | 1.50 | 28.22 | 0.81 |
| 80/20 | 1000 | 1.64 | 20.40 | 0.84 |
|  | 1060 | 2.39 | 0.67 | 1.59 |

Example 8

In this example, synthetic aggregates were produced from mixes of the low calcium silicoaluminous materials pulverized fuel ash and London clay, with the high calcium silicoaluminous materials blast furnace slag ("BFS"), and lime waste. The BFS was ground. Waste glass was also used in mixes as either a low calcium silicoaluminous material or a high calcium silicoaluminous material. The average composition of waste glass is given in Example 1. Significant constituents of PFA and GGBS are given in Table X below.

TABLE X

CHEMICAL ANALYSIS OF PFA AND GGBS

| Constituent | Weight (%) PFA | Weight (%) GGBS |
|---|---|---|
| $SiO_2$ | 52 | 35 |
| $Al_2O_3$ | 26 | 11 |
| $Fe_2O_3$ | 8.6 | 1 |
| CaO | 1.9 | 41 |

Since these materials had fine particle size distributions, they were directly mixed with each other without milling. Clay was added as a plastic binder in proportions ranging from 10% to 30% by dry weight of the total weight of the mixture. Table Y gives the materials and their proportions used for aggregate production, where low calcium silicoaluminous materials are identified as Material 1 and high calcium silicoaluminous materials are identified as Material 2.

TABLE Y

COMPOSITION OF AGGREGATE MIXES

| Material 1 | Material 2 | Material 3 | Ratio 1/2 | Ratio 1/2/3 |
|---|---|---|---|---|
| PFA | Glass | Clay |  | 80/10/10 |
| PFA | Glass | Clay |  | 70/20/10 |
| PFA | Glass | Clay |  | 60/20/20 |
| PFA | Glass | Clay |  | 50/30/20 |
| PFA | Glass | Clay |  | 40/30/30 |
| PEA | Glass | Clay |  | 40/50/10 |
| PFA | Glass | Clay |  | 30/60/10 |
| PEA | Glass | Clay |  | 20/70/10 |
| PFA | GGBS | Clay |  | 80/10/10 |
| PFA | GGBS | Clay |  | 70/20/10 |
| PFA | GGBS | Clay |  | 60/20/20 |
| PFA | GGBS | Clay |  | 50/30/20 |
| PFA | GGBS | Clay |  | 40/30/30 |
| PFA | GGBS | Clay |  | 40/50/10 |
| PFA | GGBS | Clay |  | 30/60/10 |
| PFA | GGBS | Clay |  | 20/70/10 |
| Clay | Lime waste |  | 70/30 |  |
| Clay | Lime waste |  | 50/50 |  |
| Clay | GGBS |  | 80/20 |  |
| Clay | GGBS |  | 70/30 |  |
| Clay | GGBS |  | 60/40 |  |
| Clay | GGBS |  | 50/50 |  |
| Glass | GGBS |  | 40/60 |  |
| Glass | GGBS |  | 30/70 |  |
| Glass | GGBS |  | 20/80 |  |

The materials were mixed in the above proportions and pelletized with the addition of water using the equipment described in the Examples above. The pellets were then dried in an oven at about 110° C., overnight. The resulting pellets were then pyroprocessed in a Trefoil rotary kiln shaped like a three leaf clover using fuel propane for about 15 to about 20 minutes at temperatures between about 1000° C. to about 1250° C. The aggregates were air-cooled.

The aggregates retained their integrity when removed from the kiln. They were nearly spherical or slightly angular and varied in color depending on the mix. For example, aggregates comprising high amounts of GGBS appeared whitish, while aggregates containing high amounts of PFA appeared to be dark brown. The aggregates had a hard smooth surface and were lightweight. They had a relatively hard structure when randomly crushed. These results show that good aggregates may be made of these combinations. Based on these results and the results in the Examples above, it is believed that good aggregates may also be made of combinations of PFA, clay, shale, slate, granite sawing residues, waste glass and/or furnace bottom ash, with incinerator fly ash, cement kiln dust, incinerator filter dust, blast furnace slag, limestone, gypsum, dolomite, and/or waste glass.

The embodiments described herein are examples of implementations of the invention. Modifications may be made to these examples without departing from the spirit and scope of the invention which is defined by the claims, below.

I claim:

1. A method for producing a lightweight aggregate, comprising:
    mixing sewage sludge from a waste water treatment facility with a non-coal ash silicoaluminous waste material, wherein the waste material comprises more calcium than the sewage sludge;
    agglomerating the mixture to form an agglomerate; and
    pyroprocessing the agglomerate in a rotary kiln to form a lightweight aggregate having a relative density less than 2 grams per cubic centimeter.

2. The method of claim 1, wherein the waste material comprises one or more of the following: municipal solid waste incinerator residues, waste glass, blast furnace slag, kiln dusts, or mining waste.

3. The method of claim 2, wherein the municipal solid waste incinerator residues comprise one or more of the following: air pollution control residues and incinerator bottom ash.

4. The method of claim 3, wherein the air pollution control residues comprise one or more of the following: municipal solid waste incinerator fly ash and municipal solid waste incinerator filter dusts.

5. The method of claim 2, wherein the kiln dusts comprise cement kiln dusts.

6. The method of claim 1, wherein:
    the waste material comprises more than 9% calcium by dry weight; and
    the sewage sludge comprises less than 3% calcium by dry weight.

7. The method of claim 1, wherein:
    the lightweight aggregate comprises less than 10% calcium by dry weight.

8. The method of claim 1, comprising:
    mixing from 90% to 60% sewage sludge by dry weight of the mixture with from 10% to 40% of the waste material by dry weight of the mixture.

9. The method of claim 1, further comprising:
    milling the waste material prior to mixing.

10. The method of claim 1, further comprising:
    wet milling at least the waste material.

11. The method of claim 1, comprising:
    agglomerating the mixture by pelletizing.

12. The method of claim 1, further comprising:
    mixing the sewage sludge and the waste material with a plastic binder prior to agglomerating.

13. The method of claim 1, comprising:
    pyroprocessing the agglomerate to vitrify the agglomerate.

14. The method of claim 1, further comprising:
    controlling one or more properties of the aggregate based, at least in part, on a proportion of the sewage sludge to the waste material and the pyroprocessing temperature.

15. The method of claim 14, wherein the one or more properties comprise density, the method comprising:
    controlling density of the aggregate based, at least in part, on the proportion and the temperature.

16. The method of claim 14, wherein the one or more properties comprise water absorption, the method comprising:
    controlling water absorption of the aggregate based, at least in part, on the proportion and the temperature.

17. A method for producing a lightweight aggregate, comprising:
    mixing a non-coal ash silicoaluminous waste material comprising less than 3% calcium by dry weight with at least one waste material comprising more than 9% calcium by dry weight, selected from the group consisting of: incinerator residues, kiln dusts, waste glass, blast furnace slag and mining waste;
    agglomerating the mixture to form an agglomerate; and
    pyroprocessing the agglomerate in a rotary kiln to form a lightweight aggregate having a relative density less than 2 grams per cubic centimeter.

18. A method for producing an aggregate, comprising:
    mixing sewage sludge from a waste water treatment facility and incinerator residues from a municipal solid waste incinerator;
    agglomerating the mixture to form an agglomerate; and
    pyroprocessing the agglomerate to form an aggregate.

19. The method of claim 18, wherein the incinerator residues comprise one or more of the following: incinerator bottom ash and incinerator filter dusts.

20. The method of claim 18, comprising sintering the agglomerate to form a lightweight aggregate having a relative density of less than 2 grams per cubic centimeter.

21. The method of claim 18, comprising vitrifying the agglomerate to form a lightweight aggregate having a relative density of less than 2 grams per cubic centimeter.

22. A method for producing a lightweight aggregate, comprising:
    mixing sewage sludge from a waste water treatment facility with a non-coal ash, silicoaluminous waste material, wherein the waste material comprises more calcium than the sewage sludge;
    agglomerating the mixture to form an agglomerate; and
    pyroprocessing the agglomerate to a temperature to expand the agglomerate to form a lightweight aggregate having pores and a relative density of less than 2 grams per cubic centimeter.

23. The method of claim 22, wherein the waste material comprises one or more of the following: incinerator residues, waste glass, blast furnace slag, kiln dusts and mining waste.

24. The method of claim 22, comprising pyroprocessing the agglomerate to cause volatilization and entrapment of volatized gases.

25. The method of claim 22, wherein:
    the waste material comprises more than 9% calcium by dry weight; and
    the sewage sludge comprises less than 3% calcium by dry weight.

26. A method for producing a lightweight aggregate, comprising:
    mixing sewage sludge from a waste water treatment facility with a non-coal ash silicoaluminous waste material, wherein the waste material comprises less calcium than the sewage sludge;
    agglomerating the mixture to form an agglomerate; and
    pyroprocessing the agglomerate in a rotary kiln to form a lightweight aggregate having a relative density of less than 2 grams per cubic centimeter.

27. The method of claim 26, wherein:
the waste material comprises one or more of the following: mining waste and waste glass.

28. The method of claim 26, wherein:
the waste material comprises less than 10% calcium by dry weight; and
the sewage sludge comprises more than 10% calcium by dry weight.

29. The method of claim 26, wherein:
the lightweight aggregate comprises less than 10% calcium by dry weight.

30. The method of claim 26, comprising:
mixing from 30% to 70% sewage sludge by dry weight of the mixture with from 70% to 30% of the waste material by dry weight of the mixture.

31. The method of claim 26, further comprising:
milling the waste material prior to mixing.

32. The method of claim 26, comprising:
agglomerating the mixture by pelletizing.

33. The method of claim 26, comprising:
agglomerating the mixture by extruding.

34. The method of claim 26, comprising:
pyroprocessing the agglomerate to sinter the agglomerate.

35. The method of claim 26, comprising:
pyroprocessing the agglomerate to vitrify and expand the agglomerate and cause volatilization and entrapment of volatized gases to form pores.

36. The method of claim 26, further comprising:
controlling one or more selected properties of the aggregate based, at least in part, on a proportion of the sewage sludge to the waste material and the pyroprocessing temperature.

37. The method of claim 36, wherein the one or more properties comprise density, the method comprising:
controlling density of the aggregate based, at least in part, on the proportion and the temperature.

38. The method of claim 36, wherein the one or more properties comprise water absorption, the method comprising:
controlling water absorption of the aggregate based, at least in part, on the proportion and the temperature.

39. A method for producing a lightweight aggregate, comprising:
mixing sewage sludge from a waste water treatment facility with a non-coal ash, silicoaluminous waste material, wherein the waste material comprises less calcium than the sewage sludge;
agglomerating the mixture to form an agglomerate; and
pyroprocessing the agglomerate to a temperature to expand the agglomerate to form a lightweight aggregate having pores and a relative density of less than 2 grams per cubic centimeter.

40. The method of claim 39, wherein the waste material comprises one or more of the following: mining waste and waste glass.

41. The method of claim 39, comprising pyroprocessing the agglomerate to cause volatilization and entrapment of volatized gases.

42. The method of claim 39, wherein;
the waste material comprises less than 10% calcium by dry weight; and
the sewage sludge comprises more than 10% calcium by dry weight.

43. The method of claim 1, comprising:
agglomerating the mixture by extruding.

44. The method of claim 1, comprising:
pyroprocessing the agglomerate to sinter the agglomerate.

45. The method of claim 6, comprising:
pyroprocessing the agglomerate to sinter the agglomerate.

46. The method of claim 13, comprising pyroprocessing the agglomerate to vitrify and expand the agglomerate and cause volatilization and entrapment of volatized gases to form pores.

47. A method for producing a lightweight aggregate, comprising:
mixing sewage sludge from a waste water treatment facility with a non-coal ash silicoaluminous waste material, wherein the waste material comprises more calcium than the sewage sludge;
agglomerating the mixture to form an agglomerate; and
pyroprocessing the agglomerate to form a lightweight aggregate having a relative density less than 2 grams per cubic centimeter.

48. The method of claim 47, comprising sintering the agglomerate.

49. The method of claim 47, comprising vitrifying the agglomerate.

50. The method of claim 49, comprising vitrifying the agglomerate at a temperature to expand the agglomerate and cause volatilization and entrapment of volatized gases to form pores.

51. The method of claim 47, wherein the waste material comprises one or more of the following: incinerator residues, waste glass, blast furnace slag, kiln dusts, and mining wastes.

52. The method of claim 47, wherein:
the waste material comprises more than 9% calcium by dry weight; and
the sewage sludge comprises less than 3% calcium by dry weight.

53. A method for producing a lightweight aggregate, comprising:
mixing sewage sludge from a waste water treatment facility with a non-coal ash silicoaluminous waste material, wherein the waste material comprises less calcium than the sewage sludge;
agglomerating the mixture to form an agglomerate; and
pyroprocessing the agglomerate to form a lightweight aggregate having a relative density less than 2 grams per cubic centimeter.

54. The method of claim 53, comprising sintering the agglomerate.

55. The method of claim 53, comprising vitrifying the agglomerate.

56. The method of claim 55, comprising pyroprocessing the agglomerate to a temperature to expand the agglomerate and cause volatilization and entrapment of volatized gases to form pores.

57. The method of claim 53, wherein the waste material comprises one or more of the following: mining waste and waste glass.

58. The method of claim 53, wherein:
the waste material comprises less than 10% calcium by dry weight; and
the sewage sludge comprises more than 10% calcium by dry weight.

59. The method of claim 17, comprising sintering the agglomerate.

60. The method of claim 17, comprising vitrifying the agglomerate.

61. The method of claim 60, comprising vitrifying the agglomerate at a temperature to expand the agglomerate and cause volatilization and entrapment of volatized gases to form pores.

62. The method of claim 21, comprising vitrifying the agglomerate to a temperature to expand the agglomerate and cause volatilization and entrapment of volatized gases to form pores.

* * * * *